(12) United States Patent
Narayanan et al.

(10) Patent No.: US 8,948,395 B2
(45) Date of Patent: Feb. 3, 2015

(54) SYSTEMS AND METHODS FOR KEY MANAGEMENT FOR WIRELESS COMMUNICATIONS SYSTEMS

(75) Inventors: Vidya Narayanan, San Diego, CA (US); Lakshminath Reddy Dondeti, San Diego, CA (US); Parag Arun Agashe, San Diego, CA (US); Paul E. Bender, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1615 days.

(21) Appl. No.: 11/843,583

(22) Filed: Aug. 22, 2007

(65) Prior Publication Data

US 2008/0070577 A1 Mar. 20, 2008

Related U.S. Application Data

(60) Provisional application No. 60/840,141, filed on Aug. 24, 2006.

(51) Int. Cl.
*H04L 29/06* (2006.01)
*H04W 12/04* (2009.01)
(Continued)

(52) U.S. Cl.
CPC .............. *H04L 63/062* (2013.01); *H04W 12/04* (2013.01); *H04L 9/0844* (2013.01); *H04L 9/0891* (2013.01); *H04L 2463/061* (2013.01); *H04W 36/08* (2013.01); *H04L 2209/80* (2013.01)
USPC .......................................... 380/277; 455/436

(58) Field of Classification Search
USPC .......................................... 380/277; 455/436
See application file for complete search history.

(56) References Cited

U.S. PATENT DOCUMENTS

2004/0242228 A1* 12/2004 Lee et al. .................... 455/432.1
2005/0143065 A1* 6/2005 Pathan et al. ............... 455/432.1
(Continued)

FOREIGN PATENT DOCUMENTS

| CN | 1553730 A | 12/2004 |
|---|---|---|
| CN | 1564626 A | 1/2005 |

(Continued)

OTHER PUBLICATIONS

Mishra, Arunesh, et al. "Proactive key distribution using neighbor graphs." Wireless Communications, IEEE 11.1 (2004): 26-36.*
(Continued)

*Primary Examiner* — Vikkram Bali
*Assistant Examiner* — Tracy Mangialaschi
(74) *Attorney, Agent, or Firm* — Michael J. DeHaemer, Jr.

(57) ABSTRACT

A novel key management approach is provided for securing communication handoffs between and access terminal and two access points. This approach provides for securely handing off communications between an access terminal and access point without risking exposure a master key for the access terminal. Temporary master keys are derived for low latency handoffs and secure authentication between a new access point and the access terminal. In one aspect, a distributive key management scheme is provided in which a current access point generates a new security key (based on its own security key) that is used by the next access point with which an access terminal communicates. In another aspect, a centralized key management scheme is provided in which a central authenticator maintains, generates, and distributes new security keys (based on a master security key associated with the access terminal) to access points.

26 Claims, 17 Drawing Sheets

(51) Int. Cl.
*H04L 9/08* (2006.01)
*H04W 36/08* (2009.01)

(56) References Cited

U.S. PATENT DOCUMENTS

| | | | | |
|---|---|---|---|---|
| 2006/0002351 | A1* | 1/2006 | Madour | 370/338 |
| 2006/0083200 | A1* | 4/2006 | Emeott et al. | 370/331 |
| 2006/0121883 | A1* | 6/2006 | Faccin | 455/411 |
| 2007/0153739 | A1* | 7/2007 | Zheng | 370/331 |

FOREIGN PATENT DOCUMENTS

| | | |
|---|---|---|
| CN | 1592475 A | 3/2005 |
| EP | 1439667 | 7/2004 |
| JP | 2004222300 A | 8/2004 |
| JP | 2007505531 T | 3/2007 |
| RU | 2190310 C2 | 9/2002 |
| RU | 2297037 | 4/2007 |
| WO | 2005027560 | 3/2005 |

OTHER PUBLICATIONS

International Search Report—PCT/US07/076800—International Search Authority—European Patent Office—Mar. 28, 2008.
Written Opinion—PCT/US07/076800—International Search Authority—European Patent Office, Munich—Mar. 28, 2008.
IEEE Communications Magazine, Dec. 2003, Suk Yu Hui, Challenges in the Migration to 4G Mobile Systems, pp. 54-59.
Rensselaer Polytechnic Institute, Mar. 23, 2005, Seyit A. Camtepe, Key Distribution Mechanism for Wireless Sensor Networks: a Survey.
Translation of Office Action in Russian application 2009110486 corresponding to U.S. Appl. No. 11/843,583, citing WO05027560, EP1439667A2, US20060121883, US20050143065, RU2002131451 and RU2190310 dated Jan. 21, 2011.
Taiwanese Search Report—096131524—TIPO—Dec. 10, 2010.

* cited by examiner

SYSTEMS AND METHODS FOR KEY MANAGEMENT FOR WIRELESS COMMUNICATIONS SYSTEMS

CLAIM OF PRIORITY UNDER 35 U.S.C. §119

The present application for patent claims priority to Provisional Application No. 60/840,141 entitled "Systems and Methods for Key Management for Wireless Communication Systems", filed Aug. 24, 2006 and assigned to the assignee hereof and hereby expressly incorporated by reference herein.

BACKGROUND

1. Field

Various features pertain to wireless communication systems. At least one aspect pertains to a system and method for key management for network access with low latency.

2. Background

Wireless communication networks enable communication devices to transmit and/or receive information while on the move. These wireless communication networks may be communicatively coupled to other public or private networks to enable the transfer of information to and from the mobile access terminal. Such communication networks typically include a plurality of access points (e.g., base stations) which provide wireless communication links to access terminals (e.g., mobile communication devices, mobile phones, wireless user terminals). The access points may be stationary (e.g., fixed to the ground) or mobile (e.g., mounted on satellites, etc.) and positioned to provide wide area coverage as the access terminal travels across different coverage areas.

As a mobile access terminal moves around, its communication link with an access node may degrade. In this situation, the mobile node may switch or connect with another access point for a better quality communication link while its first link is still active. This process of establishing a communication link with another access point is referred to as a "handoff". The handoff process typically faces the problem of maintaining a reliable and secure communication link with the wireless communication network while switching access points. Soft handoffs and hard handoffs are two commonly used types of handoffs. A soft handoff is one where a new communication link with a new access point is established before the existing communication link is terminated. In a hard handoff, an existing communication link is typically terminated before a new communication link is established.

In some communication systems, when a mobile access terminal attaches to a communication network through an access point, it performs network access authentication to establish a secure master key. Each time a handoff occurs, this process may be repeated. However, repeating this authentication process at each handoff introduces an unacceptable latency. One current solution to reduce this latency is to share the master key among the access points. However, this approach creates a serious security risk if an access point is compromised since the master key becomes unsecured and can be used to compromise all communications in which that master key is used.

Consequently, a method is needed that provides a low-latency handoff between an access terminal and access points without compromising security.

SUMMARY

One feature provides a system and method for key management between an access terminal (e.g., mobile terminal, wireless user terminal, etc.) and one or more access points (e.g., base stations, etc.). In particular, a scheme is provided for establishing secure communications between an access terminal and access point without risking exposure a master key for the access terminal. This approach derives temporary master keys for low latency handoffs and secure authentication between a new access point and the access terminal.

In one aspect, a distributive key management scheme is provided in which a current access point generates a new security key that is used by the next access point with which an access terminal communicates. As the access terminal moves from the current access point to a new access point, the current access point generates a new security key based on its own security key and a unique identifier for the new access point. The new security key is then sent to the new access point. The access terminal independently generates the same new security key with which it can securely communicate with the new access point.

In another aspect, a centralized key management scheme is provided in which an authenticator maintains, generates, and distributes new security keys to access points. As an access terminal moves from a current access point to a new access point, the authenticator generates a new security key based on a master security key (associated with the access terminal) and a unique identifier for the new access point. The new security key is then sent to the new access point. The authenticator repeats this process as the access terminal switches to other access points. The access terminal independently generates the same new security key with which it can securely communicate with the new access points.

Yet another feature provides an access terminal that is configured to establish and/or maintain an active set of access points with which it can communicate. Rather than obtaining or negotiating new keys (e.g., master key or transient session key) when an access terminal moves to a new access point, an active set of keys is maintained by the access terminal. That is, the access terminal may simultaneously or concurrently maintain or establish security associations (e.g., keys) with a plurality of access points within a sector, area, or region. The pre-established security keys may be subsequently employed by the access terminal to communicate with the access points in its active set without the need of reestablishing a secure relationship. Such keys may be obtained by either a centralized or distributive key management method.

An access point is provided comprising a memory and a processor. The processor may be configured to (a) generate a second temporary key from a master key; (b) instruct transmitting of the second temporary key from the access point to a second access point to allow the second access point to communicate with an access terminal; (c) establish a secure communication between the access point and the access terminal secured by a first temporary key, wherein the first temporary key is based at least partially on a different master key; and/or (d) receive a request from the access terminal to handoff the secure communication from the access point to the second access point; wherein the master key used to generate the second temporary key is based at least partially on the different master key. The master key may be a pairwise master key that may be based on a top-level master key associated with the access terminal. The processor may generate the second temporary key from the master key when a communication handoff with the access terminal is initiated from the access point to the second access point. The processor may be further configured to (a) establish a secure communication between the access point and the access terminal secured by a first temporary key, wherein the first temporary key is based at least partially on the master key; (b) receive a request from the access terminal to handoff the secure communication from the access point to the second access point; and/or (c) handoff the communication session to the second access point.

The processor may be further configured to (a) generate a third temporary key, different than the second temporary key, from the master key, and (b) instruct transmitting of the second temporary key from the access point to a third access point to communicate with the access terminal. The second temporary key may also be based on at least a unique second access point identifier associated with the second access point and the third temporary key is also based on at least a unique third access point identifier associated with the third access point. The second temporary key and the third temporary key may be transient session keys. The third temporary key may also be based on at least a pseudorandom number obtained by the second access point.

A method is also provided for (a) generating a second temporary key from a master key at a first access point, the master key being used for communication between the first access point and an access terminal; (b) transmitting the second temporary key from the first access point to a second access point to allow the second access point to communicate with the access terminal; (c) establishing a secure communication between the first access point and the access terminal secured by a first temporary key, wherein the first temporary key is based at least partially on a different master key; (d) receiving a request from the access terminal to handoff the secure communication session from the first access point to the second access point, wherein the master key used to generate the second temporary key is based at least partially on the different master key; (e) establishing a secure communication between the first access point and the access terminal secured by a first temporary key, wherein the first temporary key is based at least partially on the master key; (f) receiving a request from the access terminal to handoff the secure communication from the first access point to the second access point; and/or (g) handing off the secure communication to the second access point. The master key may be a pairwise master key based on a top-level master key associated with the access terminal. The different master key may be received by the first access point from a third access point with which the access terminal previously communicated. Additionally, generating the second temporary key may comprise generating the second temporary key when a communication handoff with the access terminal is initiated from the first access point to the second access point.

The method may further comprise (a) generating a third temporary key, different than the second temporary key, from the master key and transmitting of the third temporary key from the first access point to a third access point to communicate with the access terminal. The second temporary key may also be based on at least a unique second access point identifier associated with the second access point and the third temporary key is also based on at least a unique third access point identifier associated with the third access point. The second temporary key and the third temporary key may be transient session keys.

Consequently, an apparatus is provided comprising: (a) means for generating a second temporary key from a master key at a first access point, the master key being used for communication between the first access point and an access terminal; (b) means for transmitting the second temporary key from the first access point to a second access point to allow the second access point to communicate with the access terminal; (c) means for generating a third temporary key, different than the second temporary key, from the master key; (d) means for transmitting of the third temporary key from the first access point to a third access point to communicate with the access terminal; (e) means for initiating a communication handoff from the first access point to the second access point; (f) means for establishing a secure communication between the first access point and the access terminal secured by a first temporary key, wherein the first temporary key is based at least partially on the master key; (g) means for receiving a request from the access terminal to handoff the secure communication from the first access point to the second access point; and/or (h) means for handing off the secure communication to the second access point.

The apparatus may further comprise (a) means for establishing a secure communication between the first access point and the access terminal secured by a first temporary key, wherein the first temporary key is based at least partially on a different master key; and/or (b) means for receiving a request from the access terminal to handoff the secure communication from the first access point to the second access point; wherein the master key used to generate the second temporary key is based at least partially on the different master key.

The apparatus may also comprise (a) means for generating a third temporary key, different than the second temporary key, from the master key and transmitting of the third temporary key from the first access point to a third access point to communicate with the access terminal. The second temporary key may also be based on at least a unique second access point identifier associated with the second access point and the third temporary key is also based on at least a unique third access point identifier associated with the third access point. The second temporary key and the third temporary key may be transient session keys.

A processor readable medium comprising instructions that may be used by one or more processors, the instructions comprising: (a) instructions for generating a second temporary key from a master key at a first access point, the master key being used for communication between the first access point and an access terminal; (b) instructions for transmitting the temporary key from the first access point to a second access point to allow the second access point to communicate with the access terminal; (c) instructions for establishing a secure communication between the first access point and the access terminal secured by a first temporary key, wherein the first temporary key is based at least partially on a different master key; (d) instructions for receiving a request from the access terminal to handoff the secure communication from the first access point to the second access point; wherein the master key used to generate the second temporary key is based at least partially on the different master key; (e) instructions for establishing a secure communication between the first access point and the access terminal secured by a first temporary key, wherein the first temporary key is based at least partially on the master key; (f) instructions for receiving a request from the access terminal to handoff the secure communication from the first access point to the second access point; and/or (g) instructions for handing off the secure communication to the second access point.

The second temporary key may be generated to initiate a communication handoff from the first access point to the second access point. The processor readable medium may also include instructions for generating a third temporary key, different than the second temporary key, from the master key and transmitting of the third temporary key from the first access point to a third access point to communicate with the access terminal.

A processor is also provided comprising: a processing circuit configured to (a) establish a secure communication between the first access point and the access terminal secured by a first temporary key, wherein the first temporary key is based at least partially on a different master key; and/or (b) receive a request from the access terminal to handoff the secure communication session from the first access point to the second access point; wherein the master key used to generate the second temporary key is based at least partially on the different master key. The processing circuit may also be configured to generate a third temporary key, different than the second temporary key, from the master key and transmitting of the third temporary key from the first access point to a third access point to communicate with the access terminal; wherein the second temporary key is also based on at least a unique second access point identifier associated with the second access point and the third temporary key is also based on at least a unique third access point identifier associated with the third access point. In some implementations the processing circuit may also be configured to (a) establish a secure communication between the first access point and the access terminal secured by a first temporary key, wherein the first temporary key is based at least partially on the master key; (b) receive a request from the access terminal to handoff the secure communication from the first access point to the second access point; and/or (c) handoff the secure communication to the second access point.

An access point is also provided comprising: a memory and a processor coupled with the memory. The processor may be configured to (a) receive a first temporary key from another access point; (b) instruct communication with an access terminal utilizing the first temporary key to secure the communication; (c) receive an indication that the communication with the access terminal is to be handed off to a second access point; (d) generate a second temporary key based on the first temporary key; and/or (e) send the second temporary key to the second access point. The processor may be further configured to receive the first temporary key from the another access point when handoff is initiated to the access point from the another access point for communication with the access terminal. The first temporary key may operate for a limited time period, and the processor is further configured to receive a master key for securing communication between the access terminal and the access point and to discard utilization of the first temporary key.

A method is also provided comprising: (a) receiving a first temporary key at a first access point from another access point; (b) communicating with an access terminal utilizing the first temporary key to secure the communication; (c) receiving an indication that a communication with the first access terminal is to be handed off to a second access point; (d) generating a second temporary key based on the first temporary key; and/or (e) sending the second temporary key to the second access point.

The first temporary key may operate for a limited time period. The method may further comprise (a) receiving a master key for communication between the access terminal and the first access point and discarding utilization of the first temporary key; and/or (b) receiving the first temporary key from the another access point when handoff is initiated to the first access point from the another access point for communication with the access terminal.

Consequently, an apparatus is provided comprising: (a) means for receiving a first temporary key at a first access point, from another access point; (b) means for communicating with an access terminal utilizing the first temporary to secure the communication; (c) means for receiving a master key for communication between the access terminal and the first access point; (d) means for receiving the first temporary key from the another access point when handoff is initiated to the first access point from the another access point for communication with the access terminal; (e) means for receiving an indication that the communication with the first access terminal is to be handed off to a second access point; (f) means for generating a second temporary key based on the first temporary key; (g) means for sending the second temporary key to the second access point; and/or (h) means for discarding utilization of the first temporary key.

A processor readable medium is also provided comprising instructions that may be used by one or more processors, the instructions comprising: (a) instructions for receiving a first temporary key at a first access point, from another access point; (b) instructions for communicating with an access terminal utilizing the first temporary key to secure the communication; (c) instructions for receiving an indication that the communication with the first access terminal is to be handed off to a second access point; (d) instructions for generating a second temporary key based on the first temporary key; and/or (e) instructions for sending the second temporary key to the second access point. The first temporary key from the another access point may be received when a handoff is initiated to the first access point from the another access point for communication with the access terminal.

A processor is also provided comprising a processing circuit configured to (a) receive a first temporary key at a first access point from another access point; and (b) communicate with an access terminal utilizing the first temporary key to secure the communication. The first temporary key may operate for a limited time period and the processing circuit may be further configured to receive a master key for communication between the access terminal and the first access point and discarding utilization of the first temporary key. In some implementations, the processing circuit may be further configured to receive the first temporary key from the another access point when handoff is initiated to the first access point from the another access point for communication with the access terminal. In other implementations, the processing circuit may also be configured to (a) receive an indication that a communication with the first access terminal is to be handed off to a second access point; (b) generate a second temporary key based on the first temporary key; and/or (c) send the second temporary key to the second access point.

An access terminal may also be provided comprising: a memory and a processor coupled with the memory. The processor may be configured to (a) generate a first temporary key from a master key used for communication between a first access point and the access terminal; (b) instruct communication utilizing the first temporary key between a second access point and the access terminal; (c) instruct an authentication server to provide another master key for communication with the second access point and to discontinue use of the first temporary key; and/or (d) provide an indication that the communication with the second access point is to be handed off to a third access point. The master key may be a second temporary key used for communication between a first access point and the access terminal.

The processor may also be configured to (a) generate a second temporary key from the first temporary key used for communication between the second access point and the access terminal, and/or (b) instruct communication utilizing the second temporary key between a third access point and the access terminal.

The processor may also be configured to (a) generate a second temporary key from the master key; and/or (b) instruct communication utilizing the second temporary key between a third access point and the access terminal.

In some implementations of the access terminal, the processor may be further configured to (a) scan for access points; (b) add access points to an active set of access points as they are identified; and/or (c) establish a secure key with each access point as it is added to the active set. In a distributive key management system, the processor is further configured to generate a transient session key for each access point as it is added to the active set, wherein the transient session key is based on an interim master key associated with another access point in the active set. In a centralized key management system, the processor may be further configured to generate a transient session key for each access point as it is added to the active set, wherein the transient session key is based on a master transient key and a unique access point identifier for the access point.

A method operational on an access terminal is also provided, comprising: (a) communicating with a first access point utilizing a master key; (b) generating a first temporary key from the master key; (c) communicating with a second access point utilizing the first temporary key; (d) instructing an authentication server to provide another master key for communication with the second access point and to discontinue use of the first temporary key; (e) providing an indication that the communication with the second access point is to be handed off to a third access point. The master key may be a second temporary key used for securing the communication between a first access point and the access terminal. The master key may be a pairwise master key shared with an authentication server.

In some implementations, the method may also comprise: (a) generating a second temporary key from the first temporary key used for communication between the second access point and the access terminal, and/or (b) instructing communication utilizing the second temporary key between a third access point and the access terminal.

In other implementations, the method may also comprise: (a) generating a second temporary key from the master key; and/or (b) instructing communication utilizing the second temporary key between a third access point and the access terminal.

In a yet other implementations, the method may further comprise: (a) scanning for access points; (b) adding access points to an active set of access points as they are identified; and/or (c) establishing a secure key with each access point as it is added to the active set. In a distributive key management system, the method may further comprise generating a transient session key for each access point as it is added to the active set, wherein the transient session key is based on an interim master key associated with another access point in the active set. In a centralized key management system, the method may further comprise generating a transient session key for each access point as it is added to the active set, wherein the transient session key is based on a master transient key and a unique access point identifier for the access point.

Consequently, an access terminal is also provided comprising: (a) means for communicating with a first access point utilizing a master key; (b) means for generating a first temporary key from the master key; (c) means for communicating with a second access point utilizing the first temporary key; (d) means for instructing an authentication server to provide another master key for communication with the second access point and to discontinue use of the first temporary key; and/or (e) means for providing an indication that the communication with the second access point is to be handed off to a third access point. The master key is a second temporary key used for securing the communication between a first access point and the access terminal.

In some implementations, the access terminal may further include (a) means for generating a second temporary key from the first temporary key used for communication between the second access point and the access terminal, and/or (b) means for instructing communication utilizing the second temporary key between a third access point and the access terminal.

In some implementations, the access terminal may further include (a) means for generating a second temporary key from the master key; and/or (b) means for instructing communication utilizing the second temporary key between a third access point and the access terminal.

A processor readable medium is also provided comprising instructions that may be used by one or more processors, the instructions comprising: (a) instructions for communicating with a first access point from an access terminal utilizing a master key; (b) instructions for generating a first temporary key from the master key; (c) instructions for communicating with a second access point utilizing the first temporary key; (d) instructions for providing an indication that the communication with the second access point is to be handed off to a third access point.

In some implementations, the processor readable medium may further include (a) instructions for generating a second temporary key from the first temporary key used for communication between the second access point and the access terminal, and/or (b) instructions for instructing communication utilizing the second temporary key between a third access point and the access terminal.

In other implementations, the processor readable medium may further include (a) instructions for generating a second temporary key from the master key and/or (b) instructions for instructing communication utilizing the second temporary key between a third access point and the access terminal.

A processor is also provided comprising a processing circuit configured to (a) communicating with a first access point utilizing a master key; (b) generating a first temporary key from the master key; and/or (c) communicating with a second access point utilizing the first temporary key. The master key may be a second temporary key used for securing the communication between a first access point and the access terminal. The processing circuit may also be further configured to instruct an authentication server to provide another master key for communication with the second access point and to discontinue use of the first temporary key. In some implementations, the processing circuit may also be configured to (a) generate a second temporary key from the first temporary key used for communication between the second access point and the access terminal, and/or (b) instruct communication utilizing the second temporary key between a third access point and the access terminal. In another implementation, the processing circuit may also be configured to (a) generate a second temporary key from the master key; (b) instruct communication utilizing the second temporary key between a third access point and the access terminal. In some implementations, the processing circuit is further configured to (a) scan for access points; (b) add access points to an active set of access points as they are identified; and (c) establish a secure key with each access point as it is added to the active set.

BRIEF DESCRIPTION OF THE DRAWINGS

The features, nature, and advantages of the present aspects may become more apparent from the detailed description set

DETAILED DESCRIPTION

Figure 1:
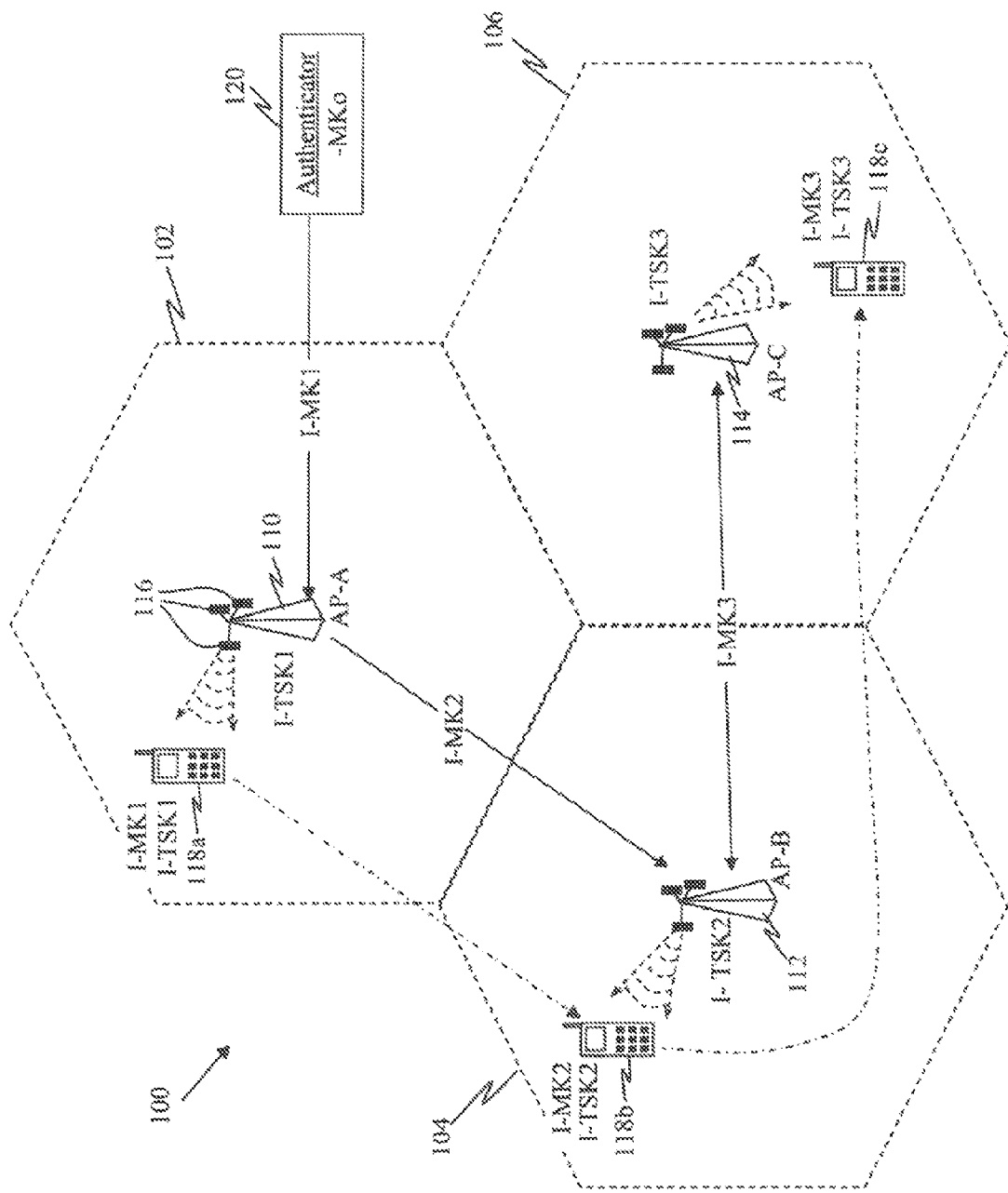
FIG. 1 illustrates a wireless communication system with distributed key management that facilitates secure, low-latency communication session handoffs.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One feature provides a system and method for key management between an access terminal (e.g., mobile terminal, wireless user terminal, etc.) and one or more access points (e.g., base stations, etc.). In particular, a scheme is provided for establishing secure communications between an access terminal and access point without risking exposure a master key for the access terminal. This approach derives temporary master keys for low latency handoffs and secure authentication between a new access point and the access terminal.

In one aspect, a distributive key management scheme is provided in which a current access point generates a new security key that is used by the next access point with which an access terminal communicates. As the access terminal moves from the current access point to a new access point, the current access point generates a new security key based on its own security key and a unique identifier for the new access point. The new security key is then sent to the new access point. The access terminal independently generates the same new security key with which it can securely communicate with the new access point.

In another aspect, a centralized key management scheme is provided in which an authenticator maintains, generates, and distributes new security keys to access points. As an access terminal moves from a current access point to a new access point, the authenticator generates a new security key based on a master security key (associated with the access terminal) and a unique identifier for the new access point. The new security key is then sent to the new access point. The authenticator repeats this process as the access terminal switches to other access points. The access terminal independently generates the same new security key with which it can securely communicate with the new access points.

Yet another feature provides an access terminal that is configured to establish and/or maintain an active set of access points with which it can communicate. Rather than obtaining or negotiating new keys when an access terminal moves to a new access point, an active set of keys is maintained by the access terminal. That is, the access terminal may simultaneously or concurrently maintain or establish security associations (e.g., keys) with a plurality of access points within a sector, area, or region. The pre-established security keys may be subsequently employed by the access terminal to communicate with the access points in its active set without the need of reestablishing a secure relationship. Such keys may be obtained by either a centralized or distributive key management method.

FIG. 1 illustrates a wireless communication system with distributed key management that facilitates secure, low-latency communication session handoffs. The multiple access wireless communication system 100 may include multiple cells, e.g. cells 102, 104, and 106. Each cell 102, 104, and 106 may include an access point 110, 112, and 114 that provides coverage to multiple sectors within the cell. Each access point 110, 112, and 114 may include one or more antennas 116 that provide network coverage to mobile terminals (e.g., user terminals) across multiple sectors in a cell. For example, in cell 102 the access point 110 includes a group of antennas 116 where each antenna provides network coverage to a different sector within the cell 102. Similarly, in cells 104 and 106 the access points 112 and 114 may include groups of antennas, where each antenna provides network coverage to a different sector within a cell.

The access points 110, 112, and 114 within each cell 102, 104, and 106 may provide network connection services to one or more access terminals. For example, as access terminal 118 moves across the different cells 102, 104, 106, it may be in communication with access points 110, 112, and 114. As used herein, transmissions from an access point to an access terminal are referred to as forward link or downlink and transmissions from the access terminal to the access point are referred to as reverse link or uplink.

An authenticator 120 may serve to manage the operation of the access points 110, 112, and 114 and/or to authenticate access terminals. In some applications, the authenticator 120 may maintain top-level master keys uniquely associated with access terminals that are served by the network 100. Master keys (MK) may be maintained between the authenticator 120 and the access terminals it serves. For example, a first top-level master key MK is known to the authenticator 120 and the access terminal 118, and is uniquely associated with the access terminal. Where an extensible authentication protocol (EAP) is implemented, such top-level master key (MK) is often referred to as a master session key (MSK). It should be understood that wherever the term 'master key' is used, it may include such MSK for EAP implementations.

In various applications, the authenticator 120 may be part of a network controller, base station controller, or access point controller that is remote or apart from the access points 110, 112, and 114 or it may be co-located with one of the access points.

In some aspects, each access terminal may be in communication with two or more sectors of one or more cells. This may be done in order to allow handoff between different sectors or cells as an access terminal moves or travels, for proper capacity management, and/or for other reasons.

As used herein, an access point may be a fixed station used for communicating with the access terminals and may also be referred to as, and include some or all the functionality of, a base station, a Node B, or some other terminology. An access terminal may also be referred to as, and include some or all the functionality of, a user equipment (UE), a wireless communication device, terminal, mobile terminal, a mobile station or some other terminology.

The transmission techniques described herein may also be used for various wireless communication systems such as a CDMA system, a TDMA system, an FDMA system, an orthogonal frequency division multiple access (OFDMA) system, a single carrier FDMA (SC-FDMA) system, and so on. An OFDMA system utilizes orthogonal frequency division multiplexing (OFDM), which is a modulation technique that partitions the overall system bandwidth into multiple (K) orthogonal subcarriers. These subcarriers are also called tones, bins, and so on. With OFDM, each subcarrier may be independently modulated with data. An SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

Some of the examples described herein refer to an extensible authentication protocol (EAP) that provides a pair-wise master key MK at an access point and an access terminal. The EAP authentication may be done between the access terminal and an authentication server (e.g., in a network controller, AAA server, etc.) via the access point acting as an authenticator; the authenticator may itself act an authentication server in some cases. In some instances, the authenticator may be co-located with one or more access points.

A Transient Session Key (TSK) is established and maintained between an access point and an access terminal. The TSK may be calculated (e.g., based on the master key MK, or MSK for EAP applications) to secure communications between the access terminal and the access point. For example, the TSK may be calculated as follows: $TSK_n = PRF(MK_n, Data)$, where PRF is a pseudo-random function such as HMAC-SHA-256 or AES-128-CMAC or another key derivation function, and Data may be parameters like an access point identifier (AP_ID), access terminal identifier (AT_ID), a random number generated by either party or even a static string. The Data parameters may be known according to system design or may be communicated during the session. In this approach, no dynamic variables are used in TSK derivation and hence, no key exchange is needed beyond EAP or EAP re-authentication for the TSK.

Oftentimes, a communication session between an access point and an access terminal uses some type of encryption to protect the data during transmission, e.g. using a key encryption scheme. However, during handoff of communications from a current access point to a new access point, there is a problem as how to continue secured communications with the new access point without compromising the communication session by transmitting the key between access points or other encryption generation values over the air. Since a new transient session key (TSK) should be established with the new access point, an new master key (MK) should be established first between the new access point and the access terminal. Additionally, it would be preferable to avoid session key sharing among access points since this introduces a vulnerability where compromise of an access point results in compromise of access points which engaged in key sharing with the compromised access point. However, negotiating the new transient session key in the critical path of the handoff increases handoff latency. Hence, it would be desirable to provide a secure, low-latency session key for each access point and access terminal pair.

According to one feature, a distributive key management scheme is provided in which a current access point generates an interim master session key (I-MK) that is used by the next access point to communicate with a mobile terminal after handoff. For example, access terminal 118a may secure communications with its current access point 110 using a secured first interim master key I-MK1. The first interim master key I-MK1 may have been based on the top-level master key MKo (known to the authenticator 120 and the access terminal 118 that is uniquely associated with the access terminal 118). As the access terminal 118b moves to a different sector or cell, its communication session may be handed off to a new access point 112. To secure communications between the access terminal 118b and the new access point 112 immediately after handoff, the current access point 110 generates a second interim master key I-MK2 based on its secured first interim master key I-MK1 and provides this new master key I-MK2 to the new access point 112. The new access point 112 then uses the second top-level master key I-MK2 for its communication session with the access terminal 118b. The second interim master key I-MK2 may be used for a prolonged period of time, or until another interim master key is obtained, to secure communication sessions. While the second interim master key I-MK2 may be generated based upon the first interim master key I-MK1, it is not a top-level master key. Thus, the top-level master key MKo associated with the access terminal 118 is not transmitted either over the air or via wired link. Once an interim master key has been established between an access point and an access terminal, it may be used to derive an interim transient session key (I-TSK).

Figure 2A:
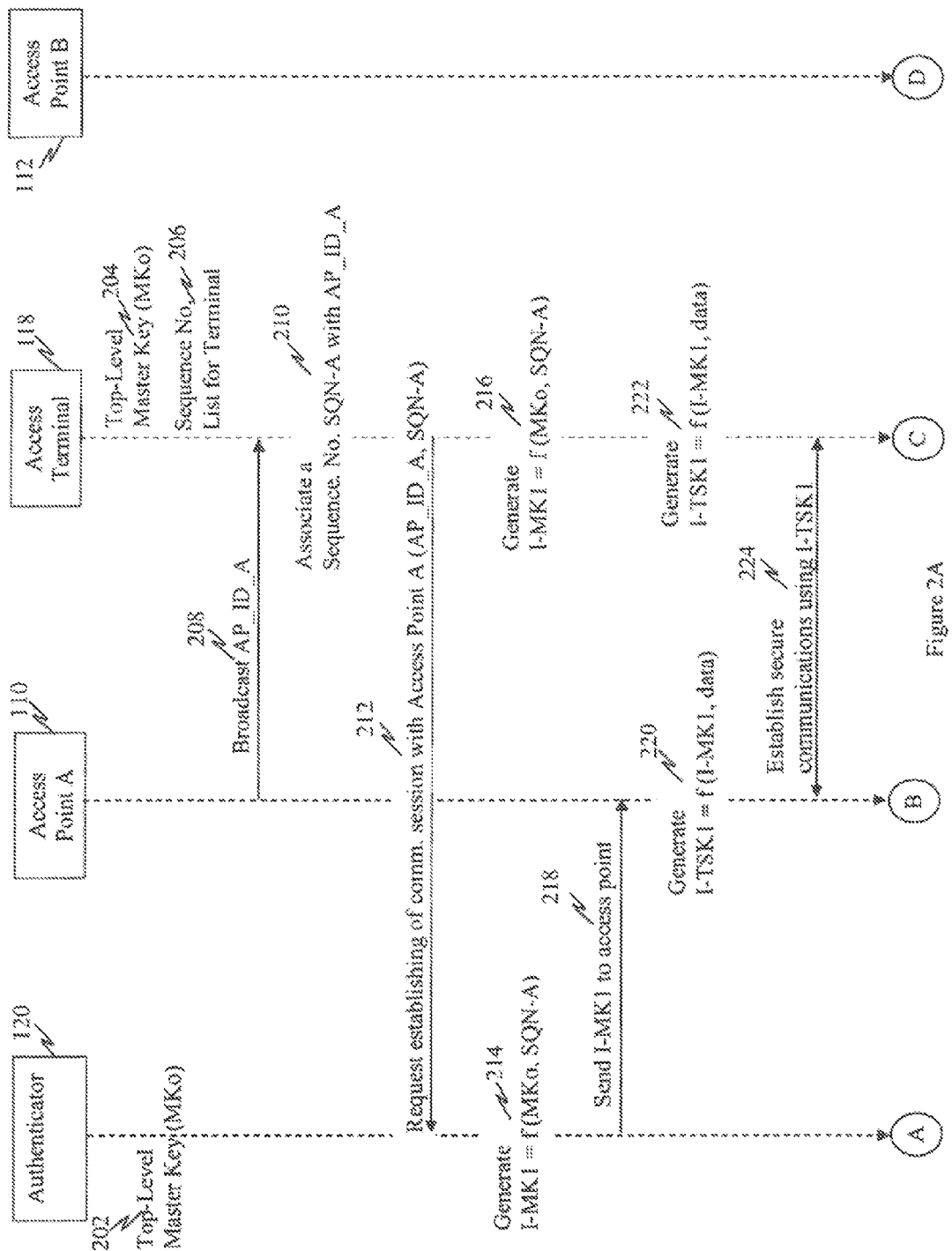
FIG. 2 (comprising FIGS. 2A and 2B) is a flow diagram illustrating the operation of a wireless communication system with distributed key management that facilitates secure, low-latency handoffs.
Figure 2B:
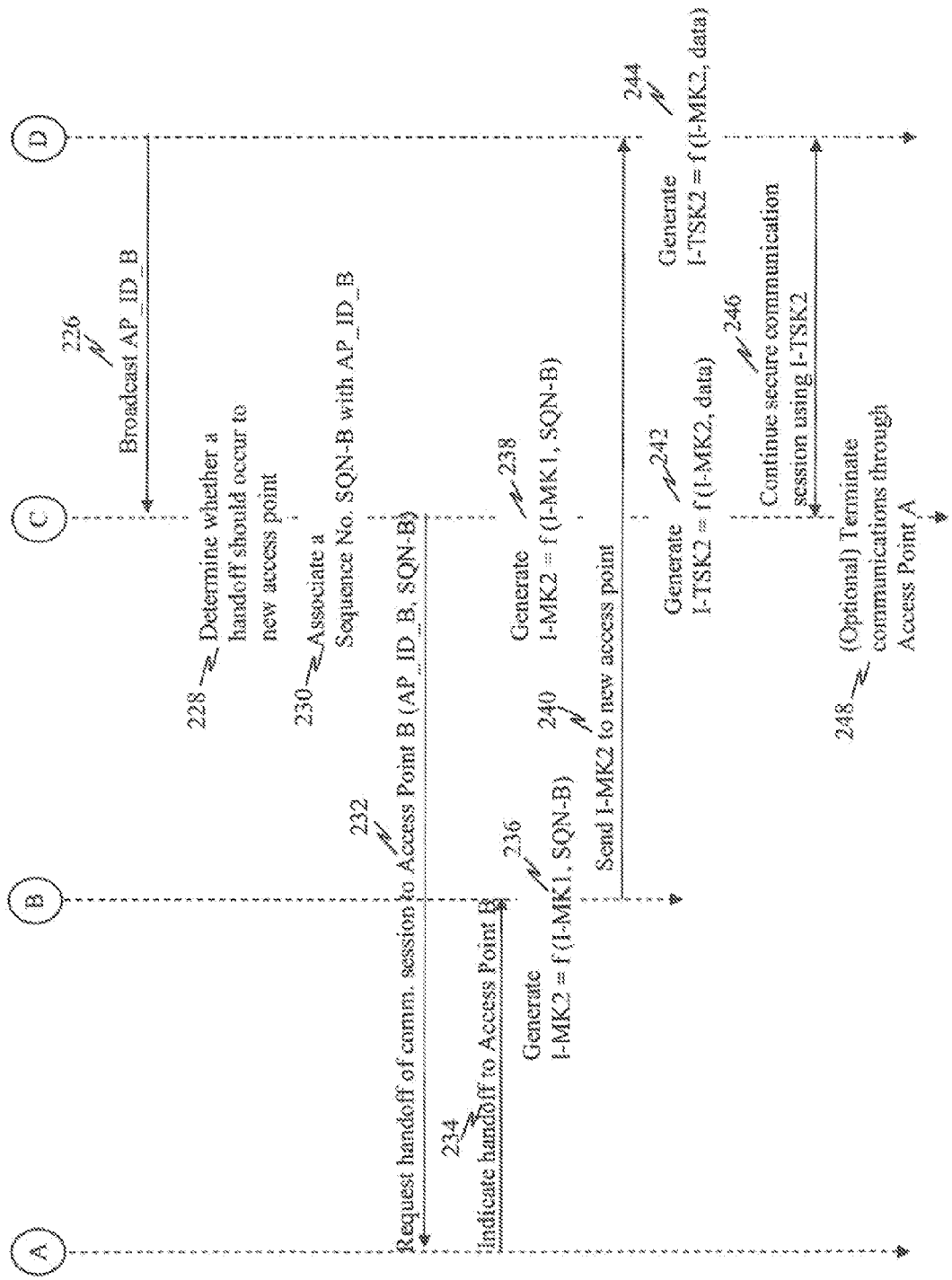

FIG. 2 (comprising FIGS. 2A and 2B) is a flow diagram illustrating the operation of a wireless communication system with distributed key management that facilitates secure, low-latency handoffs. In this example, the authenticator 120, access point A 110, access terminal 118, and access point B 112 of FIG. 1 are used for illustration purposes. The authenticator 120 and access terminal 118 may each store a top-level master key MKo 202 and 204 uniquely associated with the access terminal 118. The access terminal 118 may also maintain a sequence number list 206 used to associate an access point with a unique sequence number.

The access terminal 118 may listen for broadcasts identifying local access points 208. In one example, the access terminal may select an access point A 110 based on its signal strength in comparison to any other access points in the vicinity. The access terminal 118 associates an access point identifier AP_ID_A for access point A 110 with a unique sequence number SQN-A. The access terminal 118 then requests a communication link with access point A 110 using the identifier AP_ID_A and SQN-A 212. Both the authenticator 120 and access terminal 118 may independently generate an interim master key I-MK1 based, at least partially, on the top-level master key MKo and the assigned sequential number SQN-A 214 and 216. Note that since in the distributive key management model each I-MKn is based on a different previous I-MK(n-1), the sequential number SQN-A need not be unique across derivations of all I-MKs. The authenticator 120 then sends its interim master key I-MK1 to the access point A 218. The access point A 110 and the access terminal 118 then generate an interim transient session key (I-TSK1) as a function of the interim master key I-MK1 and (possibly) other data 220 and 222. For example, in some implementations, such other data may include a random number generated and/or supplied by the access terminal 118 and/or current access point A 110. As such, a protocol may be implemented between the access point and/or access terminal to derive, generate, and/or exchange such random number prior to (or concurrent with) derivation of the I-TSK1. Communications can then be securely established between the access point A 110 and the access terminal 118 using the session key I-TSK1 224.

The access terminal 118 may continue to listen for broadcasts from local access terminals 226 to determine whether a handoff should occur with a new access point B 228. That is, as the access terminal 118 roams or moves into a different sector or cell, or a stronger signal is detected from another access point, a handoff to a new access point may be desirable. If a handoff from a current access point A 110 to the new access point 112 is decided by the access terminal 118, it associates a sequential number SQN-B with the new access point identifier AP_ID_B 230. That is, the sequential number SQN-B associated with the new access point B 112 is sequential with sequential number SQN-A associated with the current access point A 110. The use of such sequential numbers allows the current access point A 110 and the access terminal 118 to independently or separately generate the new interim master key I-MK2.

The access terminal 118 then requests handoff of a communication session to the new access point B 112 using the identifier AP_ID_B and SQN-B 232. In some implementations, the authenticator 120 may respond to the handoff request by sending a message 234 to the current access point A 110 indicating that a current communication session will be handed off to the new access point B 112. Both the current access point A 110 and the access terminal 118 may independently generate a new interim master key I-MK2 based, at least partially, on the current interim master key I-MK1 and sequence number SQN-B associated with the new access point B 236 and 238. The current access point 110 then sends the new interim master key I-MK2 to the new access point B 240.

The new access point B 112 and the access terminal 118 then generate a new interim transient session key (I-TSK2) as a function of the new interim master key I-MK2 and (possibly) other data 242 and 244. For example, in some implementations, such other data may include a random number generated and/or supplied by the access terminal 118, current access point A 110 or new access point B 112. As such, a protocol may be implemented between the access points and/or access terminal to derive, generate, and/or exchange such random number prior to (or concurrent with) derivation of the I-TSK2. The secure communication session may then continue between the access point B 112 and the access terminal 118 using the new interim session key I-TSK2 246. Consequently, communications between the access terminal 118 and the access point A 110 are terminated 248.

The process of securely handing off a communication session from one access point to another may be repeated multiple times. For example, in FIG. 1, the access terminal 118 may roam or move from a current cell 104 to a new cell 106 and seek to handoff a session from a current access point B 112 to a new access point C 114. The access terminal 118 associates a sequential number SQN-C with the new access point C 114 and provides the SQN-C to the current access point B 112. The current access point B 112 then generates a new interim master key I-MK3 based on the current interim master key I-MK2 and SQN-C and sends the new interim master key I-MK3 to the new access point C 114. The access terminal 118 may independently generate its own version of the new interim master key I-MK3. The access terminal 118 and new access point C 114 can then generate a new interim transient session key I-TSK3 which can be used to continue the secure communication session between them.

Figure 3:
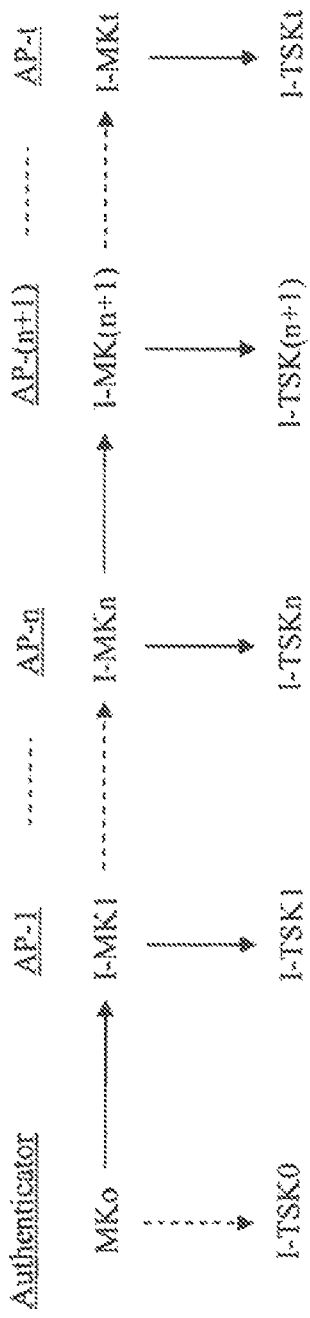
FIG. 3 illustrates a distributive model of security keys that may be used in securing communication sessions between an access terminal and a new access point during and/or after handoff.

FIG. 3 illustrates a distributive model of security keys that may be used in securing communication sessions between an access terminal and a new access point during and/or after handoff. When an access terminal wants to attach to a new access point, the current access point APn generates a new interim master key I-MK(n+1) for the new access point AP(n+1). According to one aspect, the new interim master key I-MK(n+1) may be generated as a function of the current interim master key I-MKn and possibly other parameters, such as new access point identifier (AP_ID), access terminal identifier (AT-ID), a random number generated by either party, a sequence number SQN-n provided by the access terminal, and/or even a static string. The new access point AP(n+1) and access terminal may then use the new interim master key I-MK(n+1) to generate and/or negotiate a transient session key that is used to secure communications between them. After re-keying, the access terminal stops using its previous keys I-MKn and I-TSKn.

The new interim master key I-MK(n+1) may be used exactly as a top-level master key (MKo) between the new access point AP(n+1) and the access terminal but is limited to a particular access terminal and access point pair. The new interim master key I-MK(n+1) may be used immediately after handoff of a communication session. This provides a low-latency handoff for an existing communication session, while securing such communication session. In various implementations, the new interim master key I-MK(n+1) may be used for a short time after handoff, or it may be used indefinitely, to secure communications between the access terminal and the new access point AP(n+1). In some applications, EAP authentication or re-authentication of an access terminal via an access point may be subsequently performed in order to reduce the potential of compromising the communication session. Alternatively, the new interim master key I-MK(n+1) may operate as a top-level master key (within the new access point AP(n+1)) and serve to generate additional interim master keys for other access points if a further handoff of a communication session is desired. Hence, there may be no difference between how an interim master key I-MK and a top-level master key MK are utilized for securing communications.

In the prior art approach, the same top-level master key (MKo) for an access terminal may be shared among all access points to secure communication sessions with the access terminal. If the top-level master key MKo is compromised at any one of the access points, it would compromise all communication sessions between the access terminal and all other access points. An advantage of using interim master keys I-MKs is that if one interim master key I-MKn is compromised at an access point, the interim master keys for other access points, I-MK1 . . . I-MKn−1 or MKo are not compromised. This is because each interim master key is unique to a particular access terminal and access point pair.

As used in FIGS. 1-3 and the description herein, the interim master keys (I-MKs) and interim transient session keys (I-TSK) may also be referred to as temporary keys in that they are specific to a particular access point/access terminal pair and/or they are used only for a limited amount of time after a communication session is handed off. In some implementations, such temporary keys may also be used for a prolong period of time until the communication session is handed off to another access point or the communication session ends.

Figure 4:
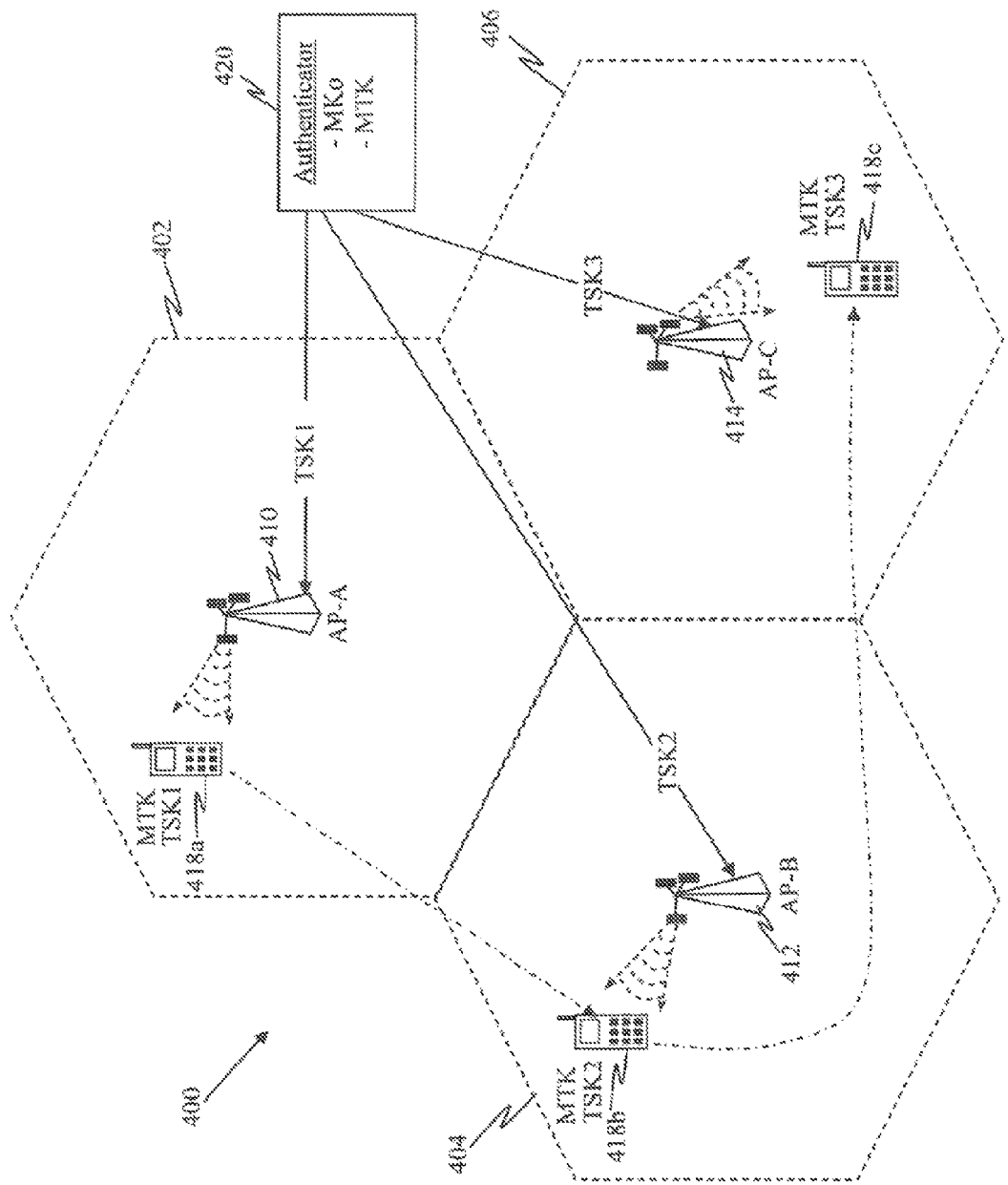
FIG. 4 illustrates a wireless communication system with centralized key management that facilitates secure, low-latency handoffs.

FIG. 4 illustrates a wireless communication system with centralized key management that facilitates secure, low-latency handoffs. In contrast to the distributive key management approach described in FIGS. 1, 2 and 3, a key management is performed by a centralized entity. The multiple access wireless communication system 400 may include multiple cells, e.g. cells 402, 404, and 406. Each cell 402, 404, and 406 may include an access point 410, 412, and 414 that provides coverage to multiple sectors within the cell. The access points 410, 412, and 414 within each cell 402, 404, and 406 may provide network connection services to one or more access terminals. For example, as an access terminal 418 moves across the different cells 402, 404, 406, it may be in communication with access points 410, 412, and 414. An authenticator 420 may serve to manage the operation of the access points 410, 412, and 414 and/or manage key authentication for access terminals. In some applications, the authenticator 420 may maintain top-level master keys uniquely associated with access terminals that are served by the network 400. For example, a first top-level master key MKo is known to the authenticator 420 and the access terminal 418, and is uniquely associated with the access terminal 418. In various applications, the authenticator 420 may be part of a network controller that is remote or apart from the access points 410, 412, and 414 or it may be co-located with one of the access points. Each access terminal may be in communication with two or more sectors of one or more cells. This may allow handoffs communication sessions between different sectors or cells as an access terminal 418 moves or travels, for proper capacity management, and/or for other reasons.

To securely handoff a communication session from a first access point to a second access point, the authenticator 420 is configured to negotiate a master transient key (MTK) with the access terminal 418. For instance, when a communication session is first established, the authenticator 420 and access terminal 418 may use the top-level master key MKo to establish the master transient key (MTK). The authenticator 420 may then generate transient session keys (TSKs) for the access points 410, 412, and 414 based (at least partially) on the master transient key (MTK), an access terminal identifier (AT_ID), and/or an access point identifier (AP_ID). The transient session key (TSKs) may be generated and/or distributed by the authenticator 420 all at once or as they are needed to handoff a session to a new access point. The access terminal 418 may similarly generate a new transient session key every time it hands off a session to a new access point.

Figure 5A:
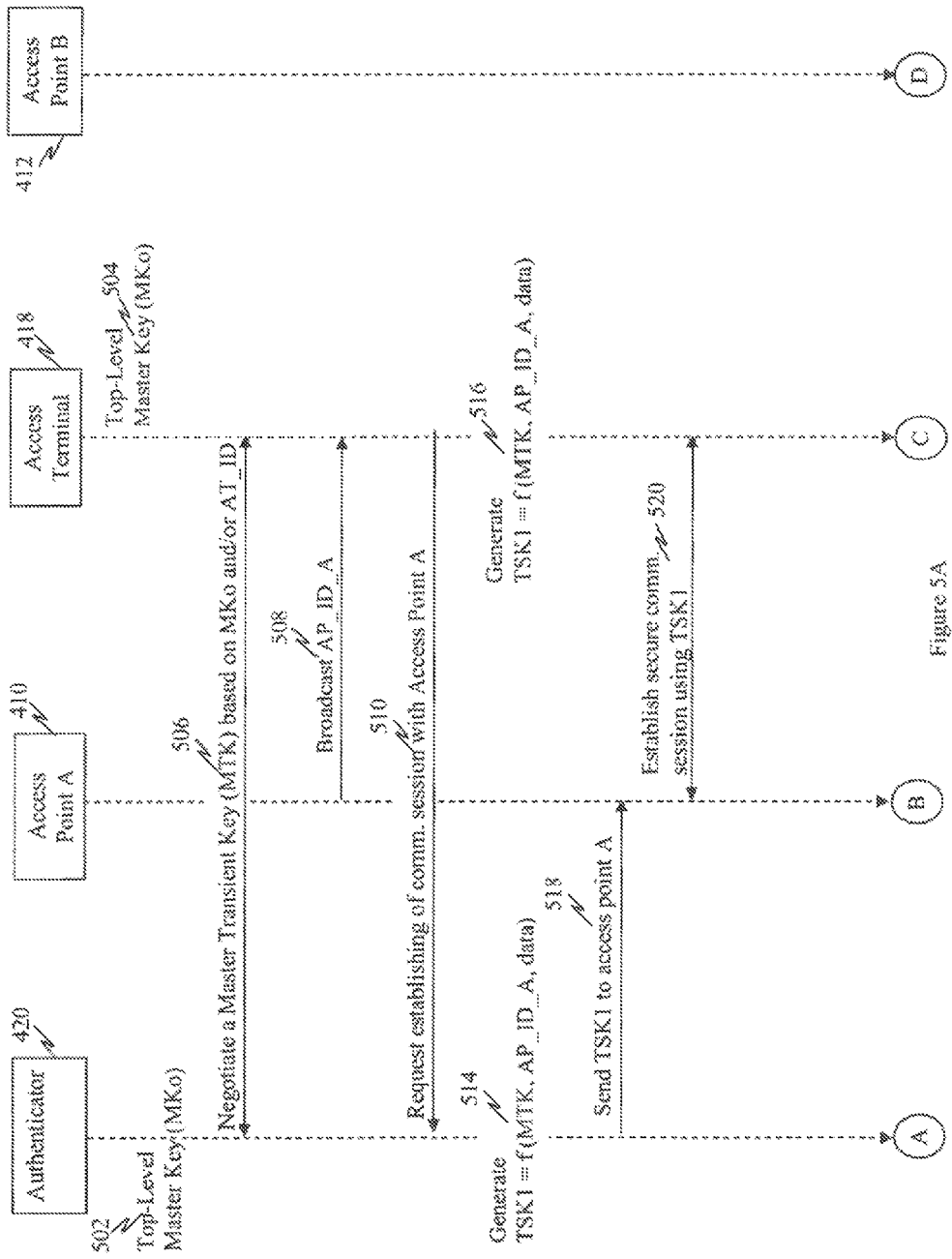
FIG. 5 (comprising FIGS. 5A and 5B) is a flow diagram illustrating the operation of a wireless communication system with centralized key management that facilitates secure, low-latency handoffs.
Figure 5B:
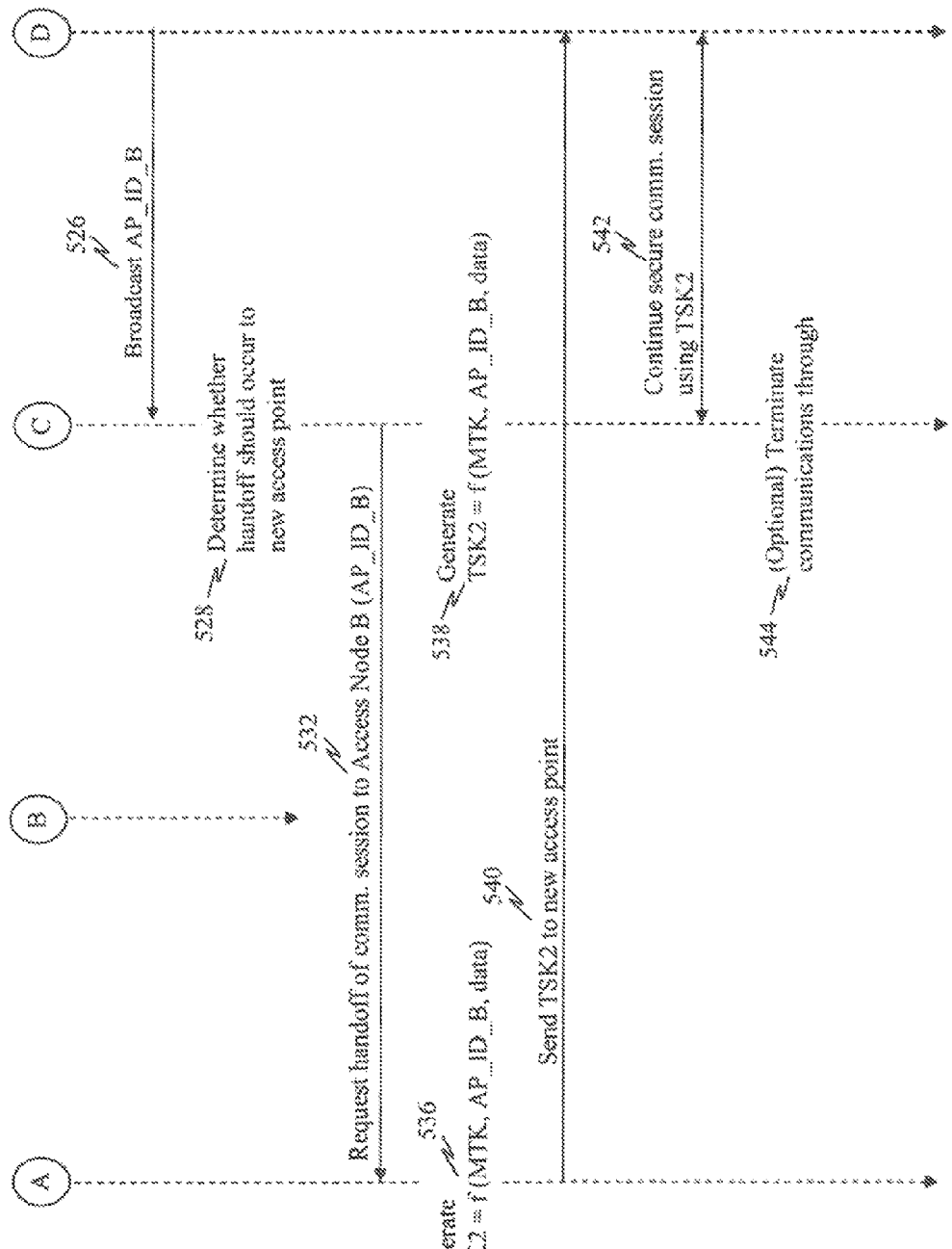

FIG. 5 (comprising FIGS. 5A and 5B) is a flow diagram illustrating the operation of a wireless communication system with centralized key management that facilitates secure, low-latency handoffs. In this example, the authenticator 420, access point A 410, access terminal 418, and access point B 412 of FIG. 4 are used for illustration purposes. The authenticator 420 and access terminal 418 may each store a top-level master key MKo 502 and 504 uniquely associated with the access terminal 418. The authenticator 420 and access terminal 418 also negotiate a master transient key (MTK) (and possibly an MTK identifier MTK_ID) via a 3-way key exchange. The MTK may be based (at least partially) on the top-level master key MKo and/or an access terminal identifier (AT_ID) 506. The MTK may be securely maintained by the authenticator 420 and access terminal 418.

In some implementations, the MTK derivation may also include a random number generated and/or supplied by the access terminal 418 and/or authenticator 420. As such, a protocol may be implemented between the authenticator 420 and/or access terminal 418 to derive, generate, and/or exchange such random number prior to (or concurrent with) derivation of the MTK.

The access terminal 418 may listen for broadcasts identifying local access points 508. In one example, the access terminal 418 may select an access point A 410 based on its signal strength in comparison to any other access points in the vicinity. The access terminal 418 requests establishing a communication session with access point A 410 using the identifier AP_ID_A 510. Both the authenticator 420 and access terminal 418 may independently generate a transient session key TSK1 based, at least partially, on the master transient key MTK and possibly the access point identifier AP_ID_A, an access terminal identifier (AT_ID) and/or other data 514 and 516. A transient session key TSKn may be generated using a pseudo-random function (PRF) or other suitable key derivation function. Because the transient session keys TSKs are generated using a common MTK, at least AP_IDs or the data used in the derivation of each TSK should be unique to a particular access point and access terminal pair. The authenticator 420 then sends the transient session key TSK1 to the access point A 518. A communications session can then be securely established between the access point A 410 and the access terminal 418 using the session key TSK1 520.

In some implementations, the TSK derivation may also include additional data, such as a random number generated and/or supplied by the access terminal 418 and/or authenticator 420. As such, a protocol may be implemented between the authenticator 420, access point 410, and/or access terminal 418 to derive, generate, and/or exchange such random number prior to (or concurrent with) derivation of the TSK.

The access terminal 418 may continue to listen for broadcasts from local access terminals 526 to determine whether a handoff should occur with a new access point B 528. That is, as the access terminal 418 roams or moves into a different sector or cell, or a stronger signal is detected from another access point, a handoff to a new access point B 412 may be desirable. If a handoff from a current access point A 410 to the new access point B 412 is decided by the access terminal 418, it requests a handoff of the communication session to the new access point B 412 using an access point identifier AP_ID_B 532. Both the authenticator 420 and the access terminal 418 may independently generate a new transient session key TSK2 based, at least partially, on the current master transient key MTK and/or the access point identifier AP_ID_B 536 and 538. The authenticator 420 then sends the new transient session key TSK2 to the new access point B 540. The secure communication session may then continue between the access point B 412 and the access terminal 418 using the new session key TSK2 542. Consequently, communications between the access terminal 418 and the access point A 410 are terminated 544.

The process of securely handing off a communication session from one access point to another may be repeated multiple times. For example, in FIG. 4, the access terminal 418 may roam or move from a current cell 404 to a new cell 406 and seek to handoff a communication session from a current access point B 412 to a new access point C 414. The access terminal 418 may request a handoff to the new access point associated with access point identifier AP_ID_C. The authenticator 420 then generates a new transient session key TSK3 based (at least partially) on the master transient key MTK and sends the transient session key TSK3 to the new access point C 414. The access terminal 418 may independently generate its own version of the new transient session key TSK3. The access terminal 418 and new access point C 414 can then use the new transient session key TSK3 to continue the secure communication session between them.

Figure 6:
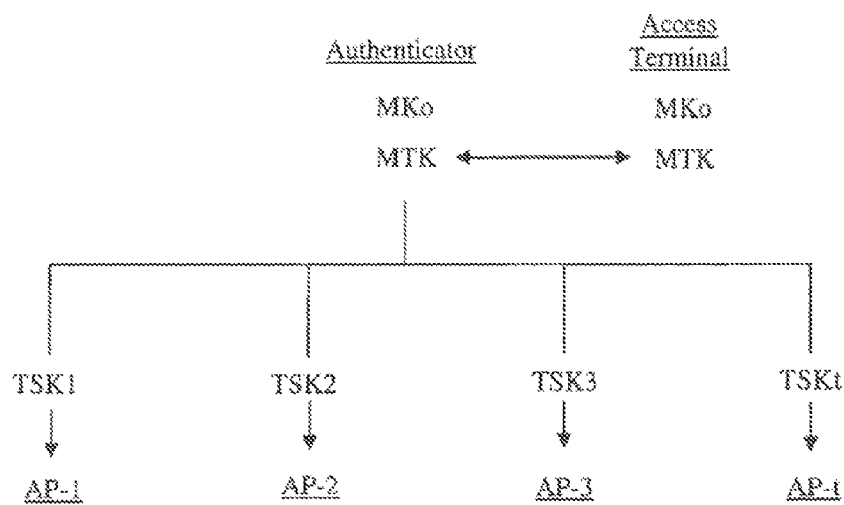
FIG. 6 illustrates a centralized model of security keys that may be used in securing communication sessions between an access terminal and a new access point during and/or after handoff.

FIG. 6 illustrates a centralized model of security keys that may be used in securing communication sessions between an access terminal and a new access point during and/or after handoff. In this centralized model, the authenticator (e.g., network controller, authentication server, etc.) and access terminal negotiate a master transient key (MTK) based on (at least partially) a top-level master key MKo uniquely associated with the access terminal. The authenticator generates, administers and/or distributes transient session keys to each access point. Because the transient master key MTK is negotiated just once (e.g., when the access terminal and authenticator first initiate communications), this speeds up the process of generating session keys. Also, even if the transient master key MTK is compromised, it does not compromise the top-level master key MKo. Moreover, because neither the top-level master key MKo or master transient key MTK are distributed to the access points (e.g., just the transient session keys are distributed), it reduces the risk of compromising security if an access point was compromised.

This centralized key management provides a low-latency handoff for an existing communication session since the transient session keys are generated and provided by the authenticator while securing communication sessions since neither the top-level master key MKo or master transient key MTK are distributed to the access points.

In various implementations, the new transient session key TSKt may be used for a short time after handoff, or it may be used indefinitely, to secure communications between the access terminal and the new access point AP-t. In some applications, EAP authentication or re-authentication of an access terminal via an access point may be subsequently performed (e.g., to renew the MTK) in order to reduce the potential of compromising the communication session.

As used in FIGS. 4-6 and the description herein, the master transient key (MTK) and transient session keys (TSKs) may also be referred to as temporary keys in that they are specific to a particular access point/access terminal pair. The MTK is used between the authenticator (which may also be an access point) and the access terminal. The TSK is used between an access point and an access terminal. In some implementations, such temporary keys may also be used for a short period of time (until a secure key is negotiated between an access terminal and access point) or a prolonged period of time (e.g., until the communication session is handed off to another access point or the communication session ends).

While the examples illustrated in FIGS. 1-6 often refer to implementing the distributive and centralized key management schemes in the context of handing off communications from a current access point to a new access point, both of these key management methods may be implemented in other contexts. In one example, rather than obtaining or negotiating new keys when an access terminal moves to a new access point, an active set of keys is maintained by the access terminal. That is, the access terminal may simultaneously or concurrently establish security associations (e.g., keys) with a plurality of access points within a sector, area, or region. The access points with which the access terminal maintains such simultaneous or concurrent security associations (e.g., keys) are referred to an "active set" of access points. Each time a new access point is added to the active set of an access terminal, the access terminal and new access point may establish a secure key. For example, the access terminal and new access point may establish an interim master key (I-MK) (in the case of a distributive key management method) or a transient session key (TSK) (in the case of a centralized key management method).

Where a distributive key management method is implemented in the context of an active set of access points, the interim master key (I-MKn) for a new access point may be based on the previous master key (I-MK(n−1)) for the previous access point added to the active set. In such configuration, the access terminal may request that the previous access point send or provide its IMK(n−1) to the newly access point.

Where a centralized key management method is implemented in the context of an active set of access points, the access terminal may simply derive a new transient session key (TSK) with the authenticator for the new access point and has the authenticator provide it to the new access point.

Using an active set of access points with either a distributive key management method (illustrated in FIGS. 1-3) or a centralized key management method (illustrated in FIGS. 4-6) enables the access terminal to quickly switch communications with access points in its active set.

Figure 7:
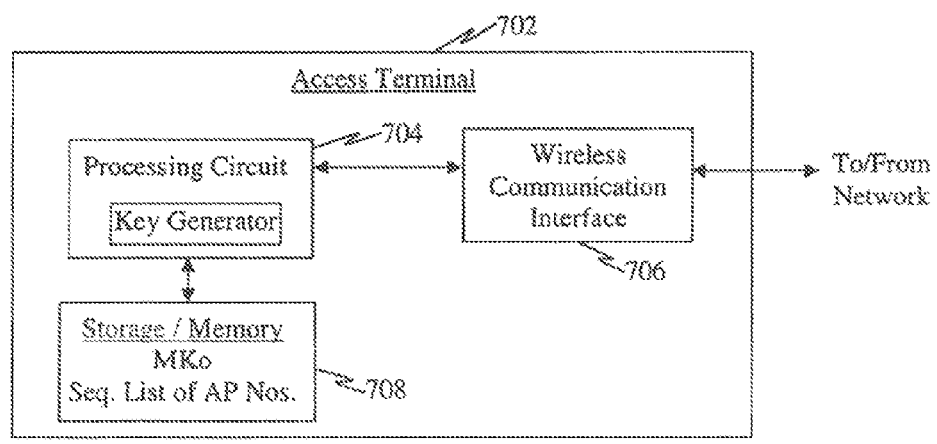
FIG. 7 is a block diagram illustrating an access terminal configured to perform low-latency secure communication session handoffs.

FIG. 7 is a block diagram illustrating an access terminal configured to perform low-latency secure communication session handoffs. The access terminal 702 may include a processing circuit 704 coupled to a wireless communication interface 706 to communicate over a wireless network and a storage device 708 to store a unique top-level master key MKo (associated with the access terminal) and a list of sequential numbers associated with identified access points. The processing circuit 704 may be configured securely handoff an ongoing communication session without noticeable interruptions in the communication session. The processing circuit 704 (e.g., processor, processing module, etc.) may include a key generator module configured to generate one or more keys that can be used to secure a communication session.

Figure 8:
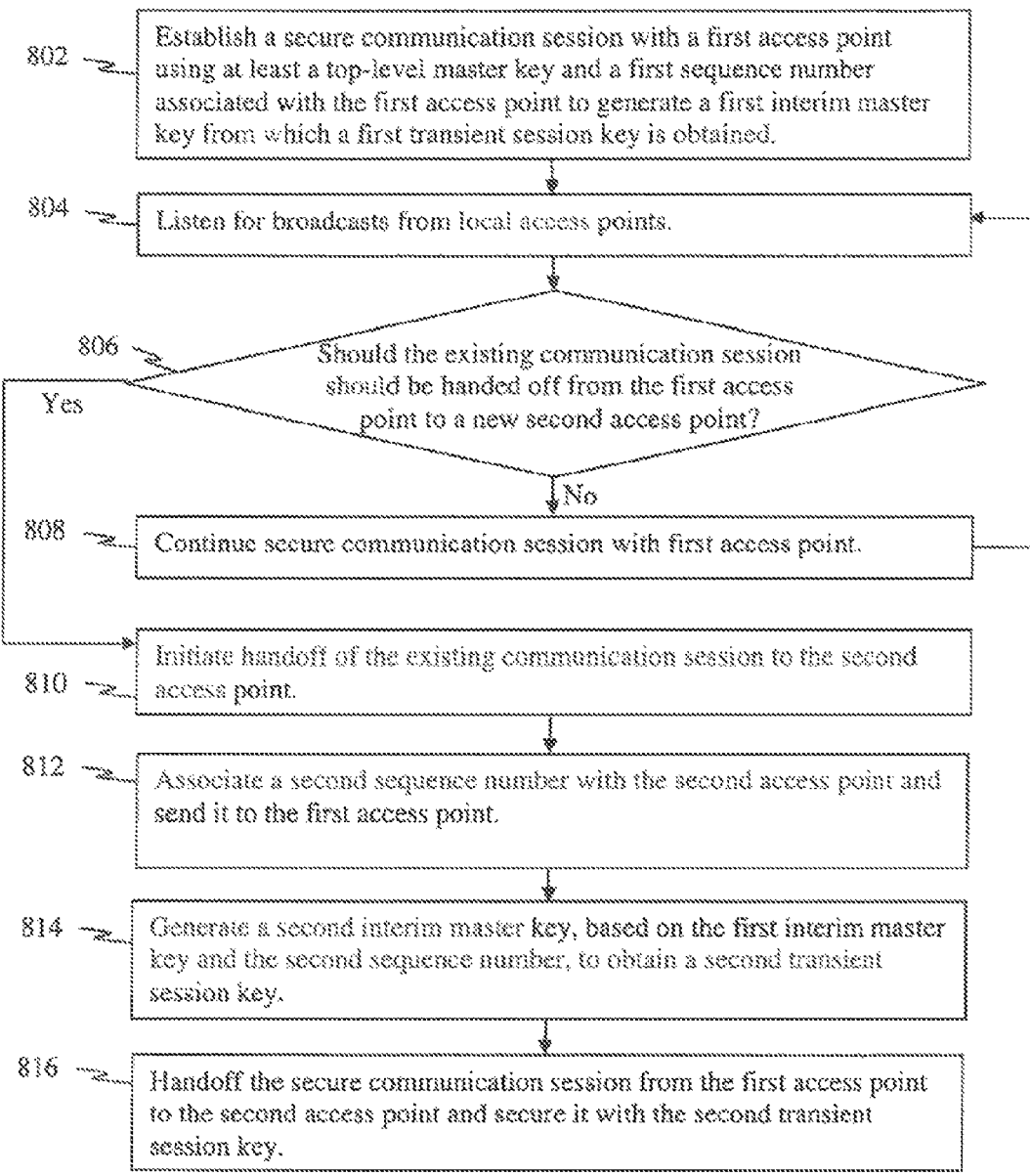
FIG. 8 is a flow diagram illustrating a method operational in an access terminal to facilitate a secure communication session handoff from a first access point to a new access point using a distributive key management approach.

FIG. 8 is a flow diagram illustrating a method operational in an access terminal to facilitate a secure communication session handoff from a first access point to a new access point using a distributive key management approach. Initially, a secure communication session may be established with a first access point using at least a top-level master key (associated with the access terminal) and a first sequence number associated with the first access point to generate a first interim master key from which a first transient session key is obtained 802. The first interim master key may be unique to the particular access terminal and first access point combination. The access terminal may then listen for broadcasts from local access points 804. If a second access point is identified, the access terminal determines whether the existing communication session should be handed off from the first access point to the second access point 806. This may be determined by comparing the signal strength and/or quality with the first access point and second access point. The access terminal may determine to continue the communication session with the first access point 808. Otherwise, the access terminal may choose to initiate handoff of the existing communication session to the second access point 810. A second sequence number may be associated with the second access point and sent to the first access point 812. The access terminal generates a second interim master key, based on the first interim master key and the second sequence number, and obtains a second transient session key 814. The access terminal then hands off the secure communication session from the first access point to the second access point and secure it with the second transient session key 816. This handoff process may be repeated multiple times with each current access point generating the new interim master key for the next access point.

Figure 9:
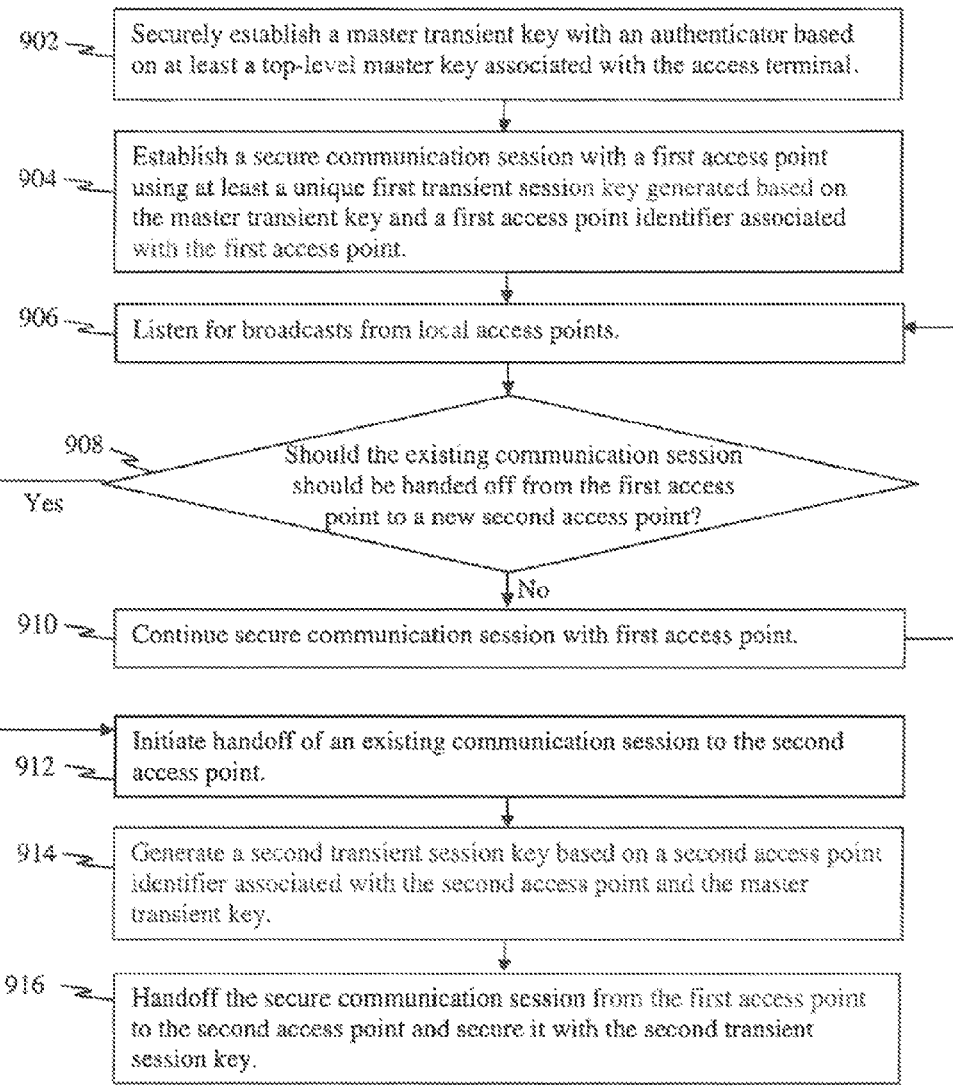
FIG. 9 is a flow diagram illustrating a method operational in an access terminal to facilitate a secure communication session handoff from a first access point to a new access point using a centralized key management approach.

FIG. 9 is a flow diagram illustrating a method operational in an access terminal to facilitate a secure communication session handoff from a first access point to a new access point using a centralized key management approach. Initially, a master transient key may be securely established with an authenticator based on at least a top-level master key associated with the access terminal 902. A secure communication session may be established with a first access point using at least a unique first transient session key generated based on the master transient key and a first access point identifier associated with the first access point 904. The access terminal may then listen for broadcasts from local access points 906. If a second access point is identified, the access terminal determines whether the existing communication session should be handed off from the first access point to the second access point 908. This may be determined by comparing the signal strength and/or quality with the first access point and second access point. The access terminal may determine to continue the communication session with the first access point 910. Otherwise, the access terminal may choose to initiate handoff of the existing communication session to the second access point 912. A second transient session key may be generated based on a second access point identifier associated with the second access point and the master transient key 914. The access terminal then hands off the secure communication session from the first access point to the second access point and secures it with the second transient session key 916. This handoff process may be repeated multiple times by using the master transient key and a new access point identifier to generate the next transient session key.

Figure 10:
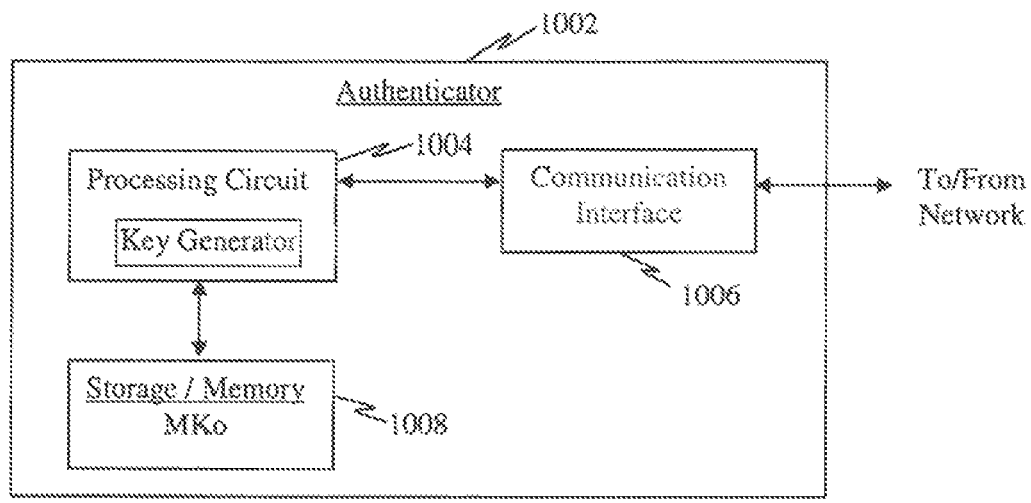
FIG. 10 is a block diagram illustrating an authenticator configured to facilitate low-latency secure communication session handoffs.

FIG. 10 is a block diagram illustrating an authenticator configured to facilitate low-latency secure communication session handoffs. The authenticator 1002 may include a processing circuit 1004 coupled to a communication interface 1006 to communicate over a network and a storage device 1008 to store a unique top-level master key MKo (associated with an access terminal). The processing circuit 1004 may be configured to facilitate a secure handoff of an ongoing communication session from an access point to an access terminal without noticeable interruptions in the communication session. The processing circuit 1004 (e.g., processor, processing module, etc.) may include a key generator module configured to generate one or more keys that can be used to secure a communication session. In various applications, the authenticator 1002 may be a located at a network controller or it may be co-located with one or more access points.

Figure 11:
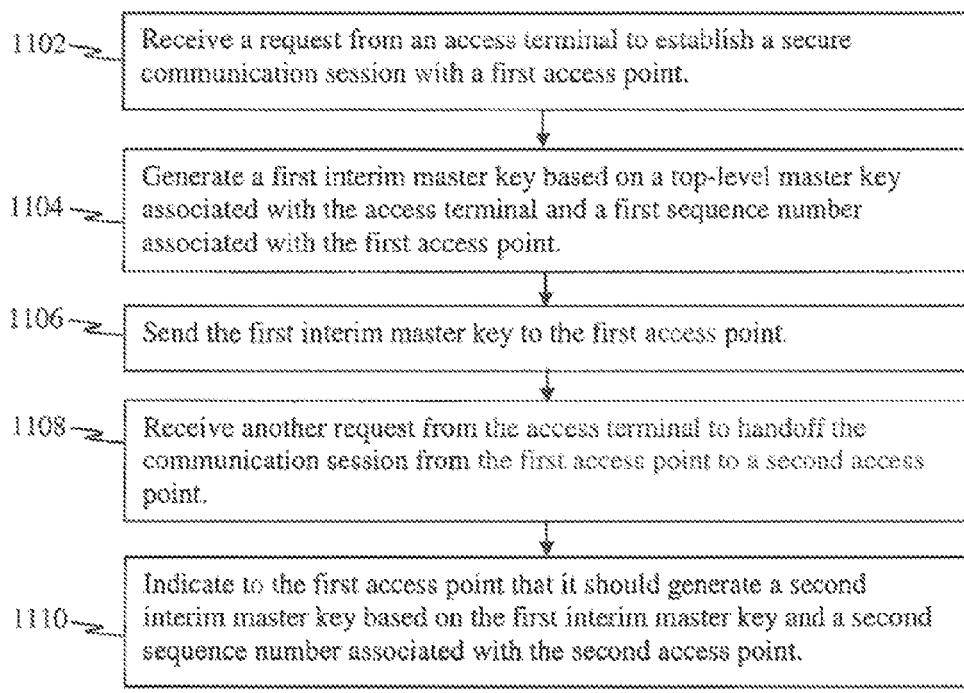
FIG. 11 is a flow diagram illustrating a method operational in an authenticator to facilitate a secure communication session handoff from a first access point to a new access point using a distributive key management approach.

FIG. 11 is a flow diagram illustrating a method operational in an authenticator to facilitate a secure communication session handoff from a first access point to a new access point using a distributive key management approach. The authenticator receives a request from an access terminal to establish a secure communication session with a first access point 1102. It then generates a first interim master key based on a top-level master key associated with the access terminal and a first sequence number (e.g., received from the access terminal) associated with the first access point 1104. The authenticator then sends the first interim master key to the first access point 1106. Subsequently, another request may be received from the access terminal to handoff the communication session from the first access point to a second access point 1108. The authenticator may indicate to the first access point that it should generate a second interim master key based on the first interim master key and a second sequence number (e.g., received from the access terminal) associated with the second access point 1110.

Figure 12:
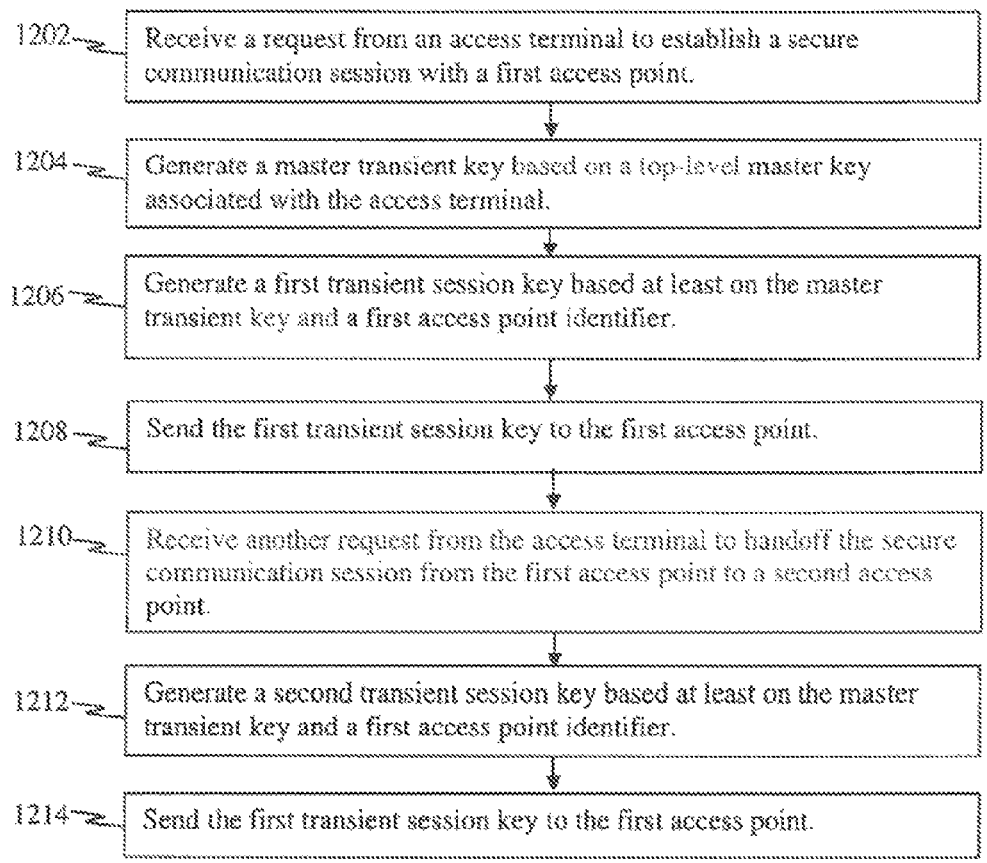
FIG. 12 is a flow diagram illustrating a method operational in an authenticator to facilitate a secure communication session handoff from a first access point to a new access point using a centralized key management approach.

FIG. 12 is a flow diagram illustrating a method operational in an authenticator to facilitate a secure communication session handoff from a first access point to a new access point using a centralized key management approach. The authenticator receives a request from an access terminal to establish a secure communication session with a first access point 1202. The authenticator generates a master transient key based on a top-level master key associated with the access terminal 1204. A first transient session key is generated by the authenticator based at least on the master transient key and a first access point identifier 1206. The first transient session key is sent by the authenticator to the first access point 1208. Subsequently, another request from the access terminal may be received by the authenticator to handoff the secure communication session from the first access point to a second access point 1210. A second transient session key is generated based at least on the master transient key and a second access point identifier 1212. The authenticator then sends the first transient session key to the first access point 1214.

Figure 13:
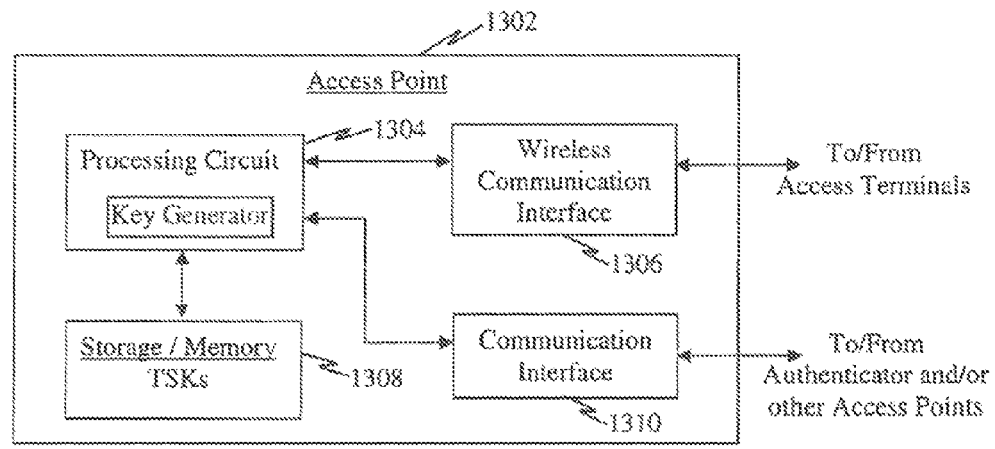
FIG. 13 is a block diagram illustrating an access point configured to facilitate low-latency secure communication session handoffs.

FIG. 13 is a block diagram illustrating an access point configured to facilitate low-latency secure communication session handoffs. The access point 1302 may include a processing circuit 1304 coupled to a wireless communication interface 1306 to communicate with one or more access terminals, a communication interface 1310 to communicate with an authenticator and/or other access points, and a storage device 1308 to store a unique top-level master key MKo (associated with an access terminal). The processing circuit 1304 may be configured to facilitate a secure handoff of an ongoing communication session from the access point 1302 to an access terminal without noticeable interruptions in the communication session. The processing circuit 1304 (e.g., processor, processing module, etc.) may include a key generator module configured to generate one or more keys that can be used to secure a communication session.

Figure 14:
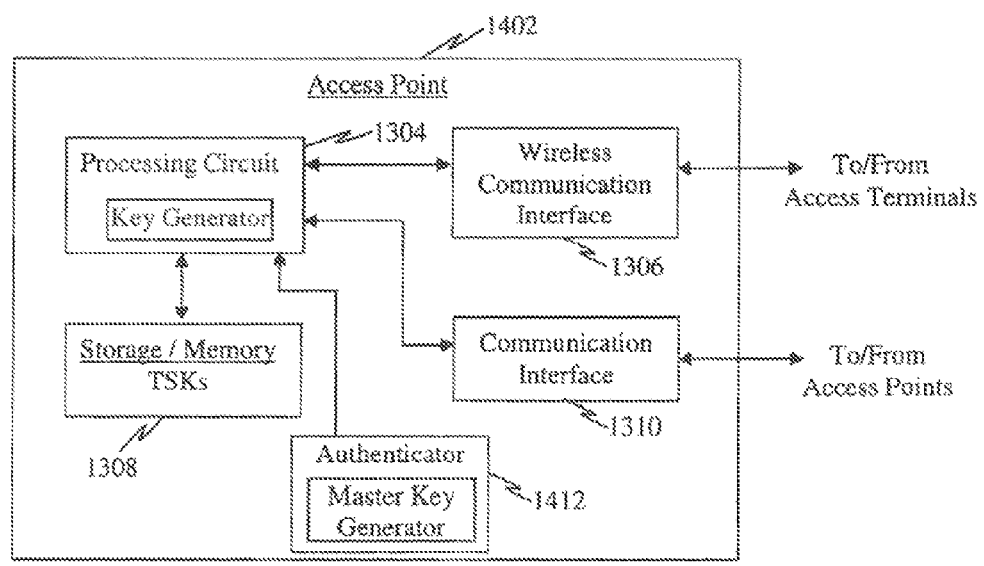
FIG. 14 is a block diagram illustrating an alternative embodiment of an access point having an integrated authenticator

FIG. 14 is a block diagram illustrating an alternative embodiment of an access point 1402 having an integrated authenticator. The access point 1402 may include many of the same components as the access point 1302 in FIG. 13 but instead of communicating with an authenticator via its communication interface 1310, the authenticator 1412 is co-located with the access point 1402. The authenticator 1412 and access point 1402 may operate as illustrated in FIGS. 1-12 and 15-17.

Figure 15:
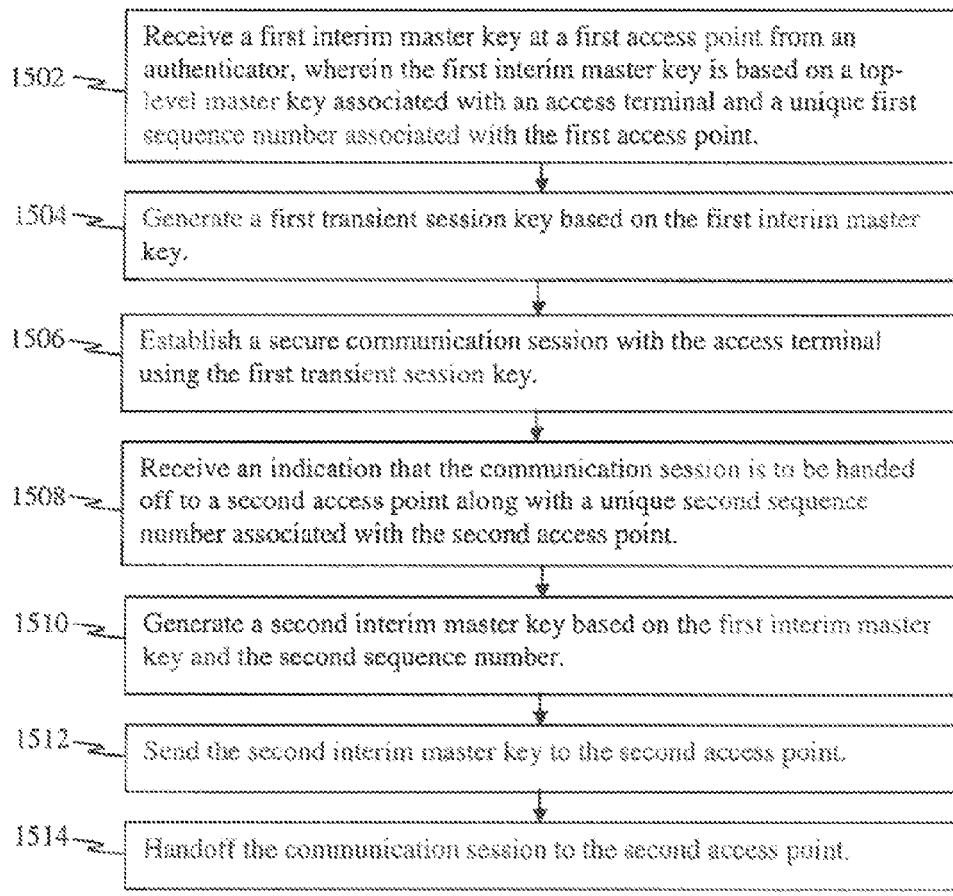
FIG. 15 is a flow diagram illustrating a method operational in a first access point to facilitate a secure communication session handoff from the first access point to a second access point using a distributive key management approach.

FIG. 15 is a flow diagram illustrating a method operational in a first access point to facilitate a secure communication session handoff from the first access point to a second access point using a distributive key management approach. In establishing a secure communication session, the first access point may receive a first interim master key from an authenticator, wherein the first interim master key is based on a top-level master key associated with an access terminal and a unique first sequence number associated with the first access point 1502. The first access point generates a first transient session key based on the first interim master key 1504. It then establishes a secure communication session with the access terminal using the first transient session key 1506. Subsequently, the first access point may receive an indication that the communication session is to be handed off to a second access point along with a unique second sequence number associated with the second access point 1508. The first access point generates a second interim master key based on the first interim master key and the second sequence number 1510 and sends the second interim master key to the second access point 1512. It can then handoff the communication session to the second access point 1514. This handoff process may be repeated multiple times with each current access point generating the new interim master key for the next access point based on the current interim master key. The new access point may then generate a new transient session key using the new interim master key.

Figure 16:
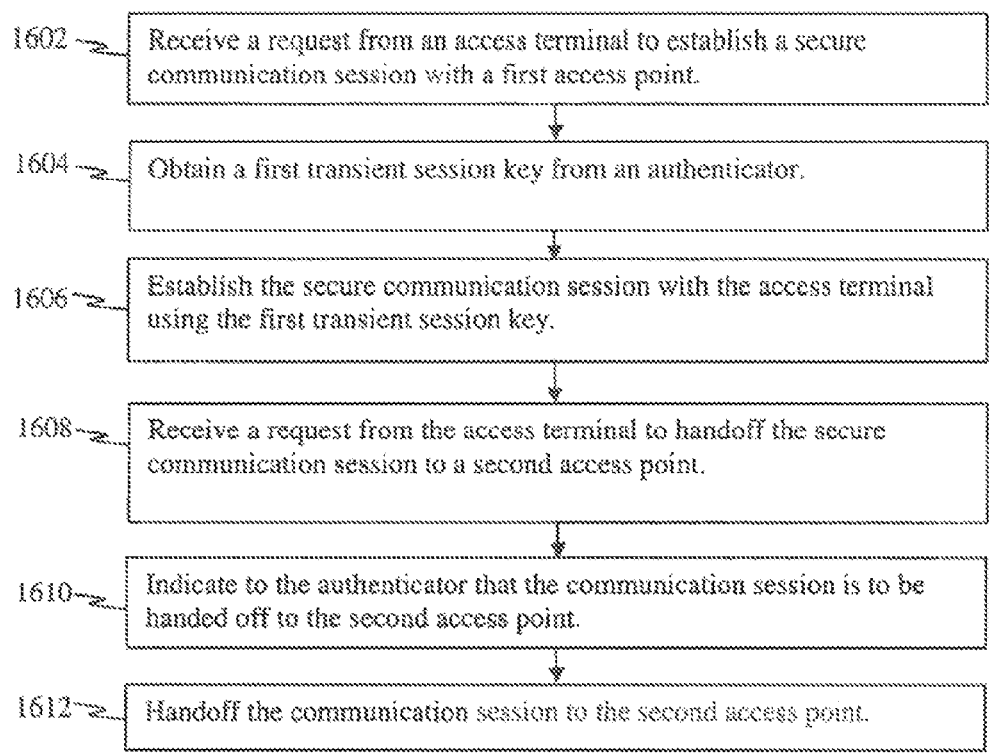
FIG. 16 is a flow diagram illustrating a method operational in a first access point to facilitate a secure communication session handoff from the first access point to a second access point using a centralized key management approach.

FIG. 16 is a flow diagram illustrating a method operational in a first access point to facilitate a secure communication session handoff from the first access point to a second access point using a centralized key management approach. The first access point receives a request from an access terminal to establish a secure communication session with a first access point 1602. It then obtains a first transient session key from an authenticator 1604. The first access point can then establish the secure communication session with the access terminal using the first transient session key 1606. Subsequently, the first access point may receive a request from the access terminal to handoff the secure communication session to a second access point 1608. This causes the first access point to indicate to the authenticator that the communication session is to be handed off to the second access point 1610. The communication session can then be handed of to the second access point 1612.

Figure 17:
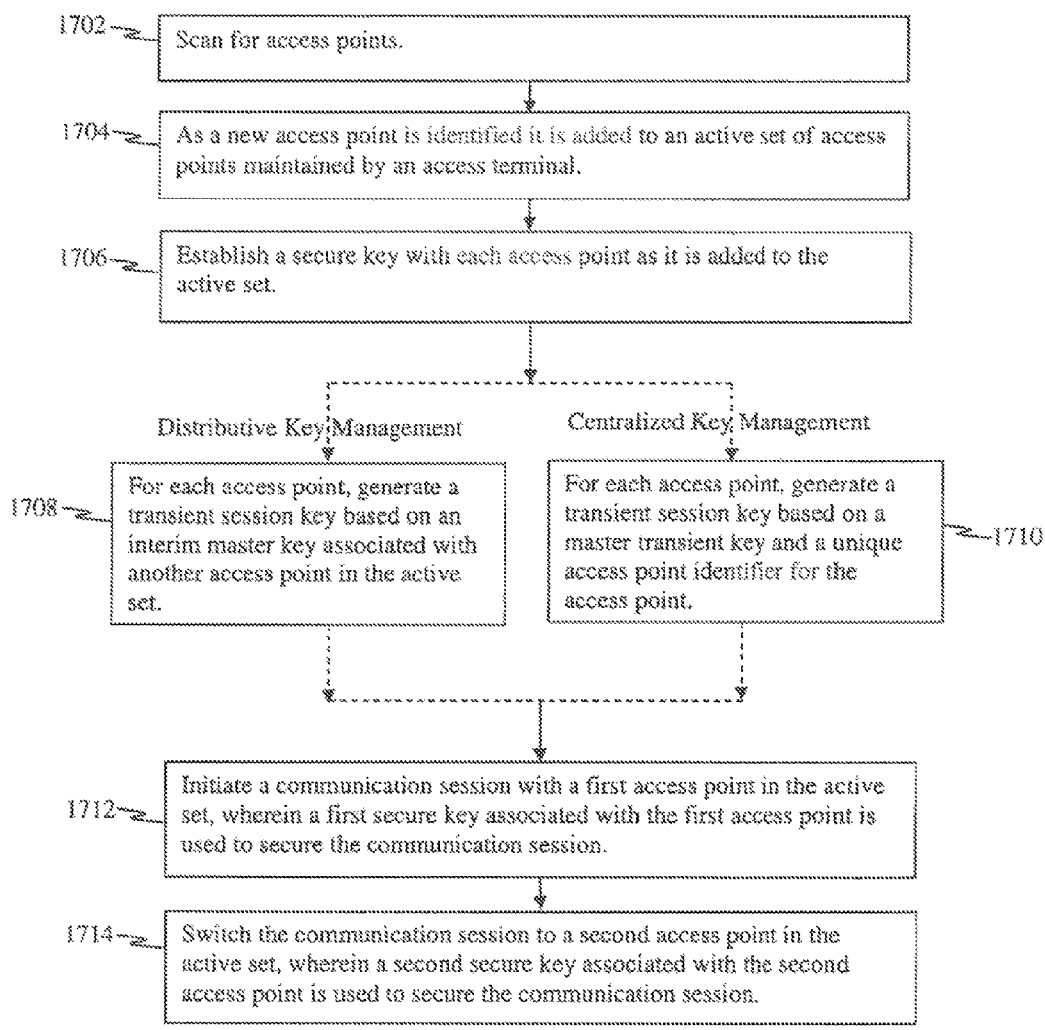
FIG. 17 is a flow diagram illustrating a method operational in an access terminal to obtain and/or establish an active set of access points.

FIG. 17 is a flow diagram illustrating a method operational in an access terminal to obtain and/or establish an active set of access points. The access terminal may scan for access points 1702. As a new access point is identified, the access terminal adds it to its active set of access points 1704. The access terminal may establish a secure key with each access point as it is added to the active set 1706.

In a distributive key management approach, the secure key for each access point may include a generating a transient session key based on an interim master key associated with another access point in the active set 1708. Such interim master key may have been generated as illustrated in FIGS. 1-3 and/or 8, for example.

In a centralized key management approach, the secure key for each access point may include a generating a transient session key based on a master transient key and a unique access point identifier for the access point in the active set 1710. Such master transient key may have been generated as illustrated in FIGS. 4-6 and/or 9, for example.

The access terminal may initiate a communication session with a first access point in the active set, wherein a first secure key associated with the first access point is used to secure the communication session 1712. The access point may subsequently switch the communication session to a second access point in the active set, wherein a second secure key associated with the second access point is used to secure the communication session 1714. Even after the access terminal switches from the first to the second access point, the first secure key may be subsequently reused if the access terminal switches back to communicating with the first access point.

One or more of the components, steps, and/or functions illustrated in FIGS. 1, 2, 3, 4, 5, 6, 7, 8, 9, 10, 11, 12, 13, 14, 15, 16, and/or 17 may be rearranged and/or combined into a single component, step, or function or embodied in several components, steps, or functions without affecting the operation of the pseudo-random number generation. Additional elements, components, steps, and/or functions may also be added without departing from the invention. The apparatus, devices, and/or components illustrated in FIGS. 1, 4, 7, 10, 13, and/or 14 may be configured to perform one or more of the methods, features, or steps described in FIGS. 2, 3, 5, 6, 8, 9, 11, 12, 15, 16 and/or 17. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. For example, some implementations of the invention may be performed with a moving or static communication device (e.g., access terminal) and a plurality of mobile or static base stations (e.g., access points).

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A method for secure handoff, comprising:
  an access terminal securely communicating with a first access point using a first transient session key, wherein the first transient session key is generated based on a first interim master key, and wherein the first interim master key is generated based on a top-level master key and a first sequence number associated with the first access point;
  the access terminal associating a second sequence number with a second access point;
  the access terminal initiating a secure handoff from the first access point to the second access point, wherein the second sequence number is forwarded to the first access point;
  the access terminal generating a second interim master key based on the first interim master key and the second sequence number;
  the access terminal generating a second transient session key based on the second interim master key; and
  the access terminal securely communicating with the second access point using the second transient session key.

2. The method for secure handoff as defined in claim 1, wherein the access terminal generating the second transient session key based on the second interim master key comprises the access terminal generating the second transient session key based on a random number and the second interim master key.

3. The method for secure handoff as defined in claim 2, wherein the random number is generated by the access terminal.

4. The method for secure handoff as defined in claim 2, wherein the random number is from the first access point.

5. The method for secure handoff as defined in claim 2, wherein the random number is from the second access point.

6. The method for secure handoff as defined in claim 1, further comprising:
  the access terminal maintaining a sequence number list for associating each access point with a unique sequence number.

7. The method for secure handoff as defined in claim 1, further comprising:
  the access terminal associating a third sequence number with a third access point;
  the access terminal initiating a secure handoff from the second access point to the third access point, wherein the third sequence number is forwarded to the second access point;
  the access terminal generating a third interim master key based on the second interim master key and the third sequence number;
  the access terminal generating a third transient session key based on the third interim master key; and
  the access terminal securely communicating with the third access point using the third transient session key.

8. The method for secure handoff as defined in claim 7, wherein the access terminal generating the third transient session key based on the third interim master key comprises the access terminal generating the third transient session key based on a second random number and the third interim master key.

9. An access terminal, comprising:
  a memory; and
  a processor coupled to the memory, the processor configured to:
    securely communicate with a first access point using a first transient session key, wherein the first transient session key is generated based on a first interim master key, and wherein the first interim master key is generated based on a top-level master key and a first sequence number associated with the first access point;
    associate a second sequence number with a second access point;
    initiate a secure handoff from the first access point to the second access point, wherein the second sequence number is forwarded to the first access point;
    generate a second interim master key based on the first interim master key and the second sequence number;
    generate a second transient session key based on the second interim master key; and
    securely communicate with the second access point using the second transient session key.

10. The access terminal as defined in claim 9, wherein generating the second transient session key based on the second interim master key comprises generating the second transient session key based on a random number and the second interim master key.

11. The access terminal as defined in claim 10, wherein the processor is further configured to:
  generate the random number.

12. The access terminal as defined in claim 9, wherein the processor is further configured to:
  maintain a sequence number list for associating each access point with a unique sequence number.

13. The access terminal as defined in claim 9, wherein the processor is further configured to:
  associate a third sequence number with a third access point;
  initiate a secure handoff from the second access point to the third access point, wherein the third sequence number is forwarded to the second access point;
  generate a third interim master key based on the second interim master key and the third sequence number;
  generate a third transient session key based on the third interim master key; and
  securely communicate with the third access point using the third transient session key.

14. The access terminal as defined in claim 13, wherein generating the third transient session key based on the third interim master key comprises generating the third transient session key based on a second random number and the third interim master key.

15. An apparatus, comprising:
   means for securely communicating with a first access point using a first transient session key, wherein the first transient session key is generated based on a first interim master key, and wherein the first interim master key is generated based on a top-level master key and a first sequence number associated with the first access point;
   means for associating a second sequence number with a second access point;
   means for initiating a secure handoff from the first access point to the second access point, wherein the second sequence number is forwarded to the first access point;
   means for generating a second interim master key based on the first interim master key and the second sequence number;
   means for generating a second transient session key based on the second interim master key; and
   means for securely communicating with the second access point using the second transient session key.

16. The apparatus as defined in claim 15, wherein the means for generating the second transient session key based on the second interim master key comprises means for generating the second transient session key based on a random number and the second interim master key.

17. The apparatus as defined in claim 16, further comprising:
   means for generating the random number.

18. The apparatus as defined in claim 15, further comprising:
   means for maintaining a sequence number list for associating each access point with a unique sequence number.

19. The apparatus as defined in claim 15, further comprising:
   means for associating a third sequence number with a third access point;
   means for initiating a secure handoff from the second access point to the third access point, wherein the third sequence number is forwarded to the second access point;
   means for generating a third interim master key based on the second interim master key and the third sequence number;
   means for generating a third transient session key based on the third interim master key; and
   means for securely communicating with the third access point using the third transient session key.

20. The apparatus as defined in claim 19, wherein the means for generating the third transient session key based on the third interim master key comprises means for generating the third transient session key based on a second random number and the third interim master key.

21. A non-transitory processor readable medium comprising instructions that when executed by one or more processors, cause the one or more processors to:
   securely communicate with a first access point using a first transient session key, wherein the first transient session key is generated based on a first interim master key, and wherein the first interim master key is generated based on a top-level master key and a first sequence number associated with the first access point;
   associate a second sequence number with a second access point;
   initiate a secure handoff from the first access point to the second access point, wherein the second sequence number is forwarded to the first access point;
   generate a second interim master key based on the first interim master key and the second sequence number;
   generate a second transient session key based on the second interim master key; and
   securely communicate with the second access point using the second transient session key.

22. The non-transitory processor readable medium of claim 21, further comprising instructions that when executed by the one or more processors cause the one or more processors to:
   generate the second transient session key based on a random number and the second interim master key.

23. The non-transitory processor readable medium of claim 22, further comprising instructions that when executed by the one or more processors cause the one or more processors to:
   generate the random number.

24. The non-transitory processor readable medium of claim 21, further comprising instructions that when executed by the one or more processors cause the one or more processors to:
   maintain a sequence number list for associating each access point with a unique sequence number.

25. The non-transitory processor readable medium of claim 21, further comprising instructions that when executed by the one or more processors cause the one or more processors to:
   associate a third sequence number with a third access point;
   initiate a secure handoff from the second access point to the third access point, wherein the third sequence number is forwarded to the second access point;
   generate a third interim master key based on the second interim master key and the third sequence number;
   generate a third transient session key based on the third interim master key; and
   securely communicate with the third access point using the third transient session key.

26. The non-transitory processor readable medium of claim 25, further comprising instructions that when executed by the one or more processors cause the one or more processors to:
   generate the third transient session key based on a second random number and the third interim master key.

* * * * *